US012728864B2

(12) United States Patent
Song et al.

(10) Patent No.: US 12,728,864 B2
(45) Date of Patent: Sep. 8, 2026

(54) VEHICLE CONTROL DEVICE AND METHOD

(71) Applicants: HYUNDAI MOTOR COMPANY, Seoul (KR); KIA CORPORATION, Seoul (KR)

(72) Inventors: Min Seok Song, Gwacheon-si (KR); Hyeon Jun Lee, Suwon-si (KR); Hyeon Woo Kim, Seoul (KR); Ji Seop Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 81 days.

(21) Appl. No.: 18/807,449

(22) Filed: Aug. 16, 2024

(65) Prior Publication Data

US 2025/0236299 A1 Jul. 24, 2025

(30) Foreign Application Priority Data

Jan. 19, 2024 (KR) ........................ 10-2024-0008802

(51) Int. Cl.

*B60W 30/182* (2020.01)
*B60L 58/13* (2019.01)
*B60W 50/00* (2006.01)

(52) U.S. Cl.

CPC ........... *B60W 30/182* (2013.01); *B60L 58/13* (2019.02); *B60W 50/0098* (2013.01);

(Continued)

(58) Field of Classification Search

CPC ........... B60W 30/182; B60W 50/0098; B60W 2554/4041; B60W 2530/209;

(Continued)

(56) References Cited

U.S. PATENT DOCUMENTS

| | | | |
|---|---|---|---|
| 9,714,024 | B2 | 7/2017 | Yoon |
| 10,668,824 | B2 | 6/2020 | Ourabah |

(Continued)

FOREIGN PATENT DOCUMENTS

| | | | |
|---|---|---|---|
| CN | 111959490 | A | 11/2020 |
| JP | 2012001168 | A | 1/2012 |

(Continued)

*Primary Examiner* — Mohamad O El Sayah
(74) *Attorney, Agent, or Firm* — Lempia Summerfield Katz LLC

(57) ABSTRACT

A vehicle control device and a method thereof are provided. The vehicle control device includes a processor, a sensor, a battery, and a memory. The processor: predicts a change in speed of a vehicle based on a route of the vehicle, using map information received from an external server, while driving the vehicle; divides the route of the vehicle into a plurality of partial routes, using the change in speed of the vehicle; obtains state of charge (SOC) information of the battery in each partial route of the plurality of partial routes, wherein the SOC information changes based on the change in speed of the vehicle; and obtains ratio information between a transit time when the vehicle passes through each partial route and a driving time of the vehicle based on a hybrid electric vehicle (HEV) mode in each partial route, using the SOC information.

20 Claims, 12 Drawing Sheets

(52) U.S. Cl.
CPC ....... *B60L 2240/12* (2013.01); *B60L 2240/16* (2013.01); *B60L 2260/20* (2013.01); *B60L 2260/54* (2013.01); *B60W 2510/244* (2013.01); *B60W 2520/105* (2013.01); *B60W 2530/209* (2020.02); *B60W 2554/4041* (2020.02); *B60W 2554/4042* (2020.02); *B60W 2556/40* (2020.02)

(58) Field of Classification Search
CPC ..... B60W 2556/40; B60W 2554/4042; B60W 2510/244; B60W 2520/105; B60L 58/13; B60L 2240/12; B60L 2240/16; B60L 2260/20; B60L 2260/54
See application file for complete search history.

(56) References Cited

U.S. PATENT DOCUMENTS 10,787,165 B2 9/2020 Park
2006/0167784 A1* 7/2006 Hoffberg ............... H04W 4/029 705/37
2015/0336572 A1* 11/2015 Makimura ............ B60W 20/14 180/65.265
2016/0137185 A1* 5/2016 Morisaki ................. B60L 50/16 180/65.265
2016/0207521 A1* 7/2016 Ogawa ................... G01C 21/34
2016/0221567 A1* 8/2016 Ogawa ................... B60K 6/442
2016/0362096 A1* 12/2016 Nikovski ........... G01C 21/3469
2017/0036663 A1* 2/2017 Kim ...................... B60W 20/12
2017/0096134 A1 4/2017 Yoon
2019/0001957 A1* 1/2019 Park ...................... B60W 10/08
2019/0126907 A1 5/2019 Park
2019/0389451 A1* 12/2019 Huang .................. B60W 10/08
2021/0101582 A1* 4/2021 Lee ......................... F16H 59/66
2022/0144241 A1* 5/2022 Ortmann ............... B60W 10/08
2022/0242390 A1* 8/2022 Li ......................... B60W 10/06
2023/0009058 A1* 1/2023 Huh ...................... B60W 20/13
2023/0036756 A1* 2/2023 Ogawa .................... B60L 50/15
2023/0227019 A1* 7/2023 Ogawa .................. B60W 20/16 701/22
2023/0339451 A1* 10/2023 Yang ..................... B60W 20/12
2024/0375637 A1* 11/2024 Nelson .................. B60W 10/06
2025/0269856 A1* 8/2025 Gesang ................. B60W 20/40

FOREIGN PATENT DOCUMENTS

JP 2015113075 A 6/2015
KR 101713734 B1 3/2017
KR 20190030011 A 3/2019
KR 20190049143 A 5/2019
KR 20190081379 A 7/2019
KR 20200099642 A 8/2020
KR 20210065552 A 6/2021

* cited by examiner

VEHICLE CONTROL DEVICE AND METHOD

CROSS-REFERENCE TO RELATED APPLICATION

This application claims the benefit of and priority to Korean Patent Application No. 10-2024-0008802, filed in the Korean Intellectual Property Office on Jan. 19, 2024, the entire contents of which are incorporated herein by reference.

TECHNICAL FIELD

The present disclosure relates to a vehicle control device and method, and more particularly, relates to technologies for selecting a mode for controlling a vehicle.

BACKGROUND

Recently, a technology for controlling a mode of a vehicle depending on a state of charge (SOC) of a battery has been studied. Such a technology may implement SOC charging power when predicting the discharging of the SOC and may apply an SOC discharging strategy when predicting overcharging of the SOC, thus adjusting the SOC. In this regard, because a technology for controlling a mode of a vehicle, which is currently studied, is able to be applied only if the vehicle is traveling on a road including a slope with a large fluctuation range of the SOC, its application section may be limited. Map information corresponding to a route along which the vehicle is traveling and sensing data obtained from a sensor may be used in parallel to predict an SOC, thereby improving the accuracy of the SOC progress or fuel consumption. However, a large amount of calculation and time may be consumed in the process of obtaining a dataset for inferring the amount of fuel and the SOC of the battery over time.

The statements in this section merely provide background information related to the present disclosure and may not constitute prior art.

SUMMARY

The present disclosure has been made to solve the above-mentioned problems occurring in the prior art while advantages achieved by the prior art are maintained intact.

An aspect of the present disclosure provides a vehicle control device for controlling a hybrid electric vehicle (HEV), based on an HEV mode or an electric vehicle (EV) mode and a method thereof.

Another aspect of the present disclosure provides a vehicle control device for dividing a route from a location of a vehicle to a destination into a plurality of partial routes and controlling the vehicle, using ratio information corresponding to each of the plurality of partial routes, and a method thereof.

Another aspect of the present disclosure provides a vehicle control device and a method for predicting power and a speed of the vehicle, using sensor information obtained in real-time, to minimize fuel consumed while driving the vehicle.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a vehicle control device may include a processor, a sensor, a battery, and a memory. The processor may be configured to predict a change in speed of a vehicle based on a route of the vehicle, using map information received from an external server, while driving the vehicle. The processor may be configured to divide the route of the vehicle into a plurality of partial routes, using the change in speed of the vehicle. The processor may be configured to obtain state of charge (SOC) information of the battery in each partial route of the plurality of partial routes. The SOC information changes based on the change in speed of the vehicle. The processor may be configured to obtain ratio information between a transit time when the vehicle passes through each partial route and a driving time of the vehicle based on a hybrid electric vehicle (HEV) mode in each partial route, using the SOC information. The processor may be configured to predict acceleration of the vehicle, in a partial route in which the vehicle is located among the plurality of partial routes, using the sensor. The processor may be configured to obtain fuel consumption information for minimizing fuel consumed while the vehicle is traveling along the route, in the partial route in which the vehicle is located, using acceleration information indicating the predicted acceleration of the vehicle and the ratio information. Additionally, the processor may be configured to control the vehicle along the route, based on an electric vehicle (EV) mode or the HEV mode, using the fuel consumption information.

In an embodiment, the processor may be configured to obtain the ratio information from the map information, in a first layer having a dynamic programming algorithm and associated with global path planning. The processor may be configured to obtain the fuel consumption information, using the ratio information obtained in the first layer, in a second layer having at least one of an acceleration prediction model, a vehicle required power model, or a vehicle control model, and associated with local path planning.

In an embodiment, the processor may be configured to predict the acceleration of the vehicle, based on at least one of a relative location of another vehicle located around the vehicle and a speed of the other vehicle, using the sensor.

In an embodiment, the processor may be configured to identify an average speed of the vehicle in each of the plurality of partial routes. The average speed follows the change in speed of the vehicle. The processor may be configured to obtain the SOC information of the battery in each partial route. The SOC information indicates an SOC of the battery, and the SOC information corresponds to the average speed of the vehicle.

In an embodiment, the processor may be configured to predict power, using at least one of a rolling resistance coefficient (RRC) of a wheel of the vehicle, an aerodynamic coefficient, an equivalent test weight (ETW), or any combination thereof. The processor may be configured to predict a speed of the vehicle, and the speed may be obtained based on the acceleration. The processor may be configured to obtain the fuel consumption information, using at least one of power information indicating the predicted power, speed information indicating the speed of the vehicle, the ratio information, or any combination thereof.

In an embodiment, the processor may be configured to predict a first energy amount to be consumed when controlling the vehicle along at least a portion of the route based on the HEV mode, using the power information and the speed information. The processor may be configured to predict a second energy amount to be consumed when controlling the vehicle along at least a portion of the route based on the EV mode. Additionally, the processor may be configured to obtain the fuel consumption information, using the first energy amount and the second energy amount.

In an embodiment, the processor may be configured to calculate another piece of SOC information indicating an SOC of the battery using the power information and the speed information. The other piece of SOC information may change when controlling the vehicle based on the EV mode. The processor may also be configured to obtain the fuel consumption information, using the calculated other SOC information and the ratio information.

In an embodiment, the processor may be configured to identify the transit time when the vehicle passes through each partial route based on an average speed of the vehicle. The average speed may follow the change in speed of the vehicle.

In an embodiment, the processor may be configured to control the vehicle based on the EV mode or the HEV mode, along the partial route in which the vehicle is located, using sub-ratio information corresponding to the partial route in which the vehicle is located in the ratio information and the acceleration information.

The vehicle control device according to an embodiment may further include an engine. In an embodiment, the processor may be configured to obtain the ratio information, using engine information indicating whether to drive the engine for controlling the vehicle based on the HEV mode.

In an embodiment, the map information may include at least one of grade information of a road corresponding to the route, a speed limit of the road, traffic volume on the road, or any combination thereof.

According to another aspect of the present disclosure, a vehicle control method may include predicting a change in speed of a vehicle based on a route of the vehicle, using map information received from an external server, while driving the vehicle. The method may include dividing the route of the vehicle into a plurality of partial routes, using the change in speed of the vehicle. The method may also include obtaining state of charge (SOC) information of a battery in each of the plurality of partial routes. The SOC information may change based on the change in speed of the vehicle. The method may also include obtaining ratio information between a transit time when the vehicle passes through each partial route and a driving time of the vehicle based on a hybrid electric vehicle (HEV) mode in each partial route, using the SOC information. The method may also include predicting acceleration of the vehicle, in a partial route in which the vehicle is located among the plurality of partial routes, using a sensor. The method may also include obtaining fuel consumption information for minimizing fuel consumed while the vehicle is traveling along the route, in the partial route in which the vehicle is located, using acceleration information indicating the predicted acceleration of the vehicle and the ratio information. Additionally, the method may include controlling the vehicle along the route, based on an electric vehicle (EV) mode or the HEV, using the fuel consumption information.

In an embodiment, the vehicle control method may further include obtaining the ratio information from the map information, in a first layer including a dynamic programming algorithm and associated with global path planning. The method may also include obtaining the fuel consumption information, using the ratio information obtained in the first layer, in a second layer including at least one of an acceleration prediction model, a vehicle required power model, or a vehicle control model, and associated with local path planning.

In an embodiment, the predicting of the acceleration may include predicting the acceleration of the vehicle, based on at least one of a relative location of another vehicle located around the vehicle and a speed of the other vehicle, using the sensor.

In an embodiment, the obtaining of the SOC information of the battery may include identifying an average speed of the vehicle, the average speed following the change in speed of the vehicle, in each partial route. The method may also include obtaining the SOC information of the battery in each partial route. The SOC information indicates an SOC of the battery, and the SOC information corresponds to the average speed of the vehicle.

In an embodiment, the obtaining of the fuel consumption information may include predicting power, using at least one of a rolling resistance coefficient (RRC) of a wheel of the vehicle, an aerodynamic coefficient, an equivalent test weight (ETW), or any combination thereof. The obtaining of the fuel consumption information may include predicting a speed of the vehicle, and the speed to be obtained based on the acceleration. The obtaining of the fuel consumption information may also include obtaining the fuel consumption information, using at least one of power information indicating the predicted power, speed information indicating the speed of the vehicle, the ratio information, or any combination thereof.

In an embodiment, the obtaining of the fuel consumption information may include predicting a first energy amount to be consumed when controlling the vehicle along at least a portion of the route based on the HEV mode, using the power information and the speed information. The obtaining of the fuel consumption information may also include predicting a second energy amount to be consumed when controlling the vehicle along at least a portion of the route based on the EV mode. Additionally, the obtaining of the fuel consumption information may include obtaining the fuel consumption information, using the first energy amount and the second energy amount.

In an embodiment, the obtaining of the fuel consumption information may include calculating another piece of SOC information indicating an SOC of the battery using the power information and the speed information. The other piece of SOC information changes when controlling the vehicle based on the EV mode. The obtaining of the fuel consumption information may also include obtaining the fuel consumption information, using the calculated other SOC information and the ratio information.

The vehicle control method according to an embodiment may further include identifying the transit time when the vehicle passes through each partial route based on an average speed of the vehicle. The average speed follows the change in speed of the vehicle.

In an embodiment, the controlling of the vehicle may include controlling the vehicle based on the EV mode or the HEV mode, along the partial route in which the vehicle is located, using sub-ratio information corresponding to the partial route in which the vehicle is located in the ratio information and the acceleration information.

In an embodiment, the obtaining of the ratio information may include obtaining the ratio information, using engine information indicating whether to drive an engine for controlling the vehicle based on the HEV mode.

In an embodiment, the map information may include at least one of grade information of a road corresponding to the route, a speed limit of the road, or traffic volume on the road, or any combination thereof.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
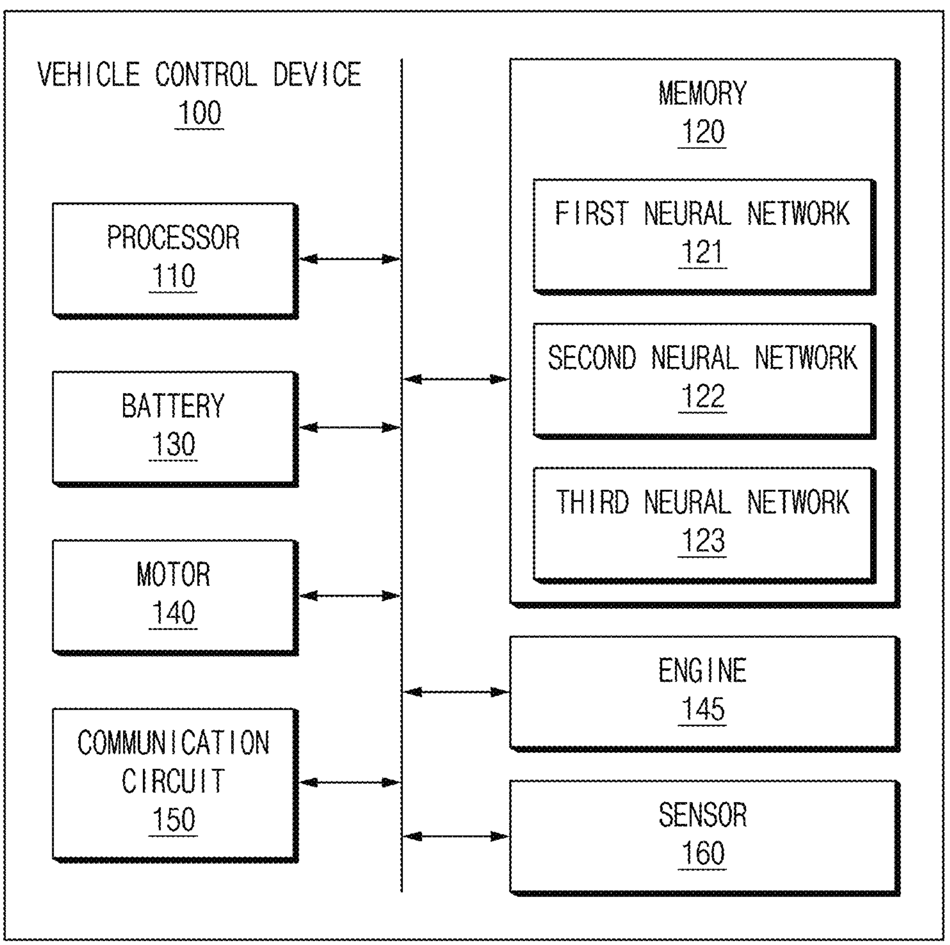
FIG. 1 illustrates an example of a block diagram associated with a vehicle control device according to an embodiment of the present disclosure.

Hereinafter, the embodiments of the present disclosure are described in detail with reference to the drawings. It should be appreciated that various embodiments of the present disclosure and the terms used therein are not intended to limit the technological features set forth herein to particular embodiments and include various changes, equivalents, or replacements for a corresponding embodiment.

In adding the reference numerals to the components of each drawing, it should be noted that the identical component is designated by the identical numerals even when they are displayed on other drawings. In addition, a detailed description of well-known features or functions should be ruled out in order not to unnecessarily obscure the gist of the present disclosure.

In describing components of embodiments of the present disclosure, the terms first, second, A, B, (a), (b), and the like may be used herein. These terms are only used to distinguish one component from another component, but do not limit the corresponding components irrespective of the order or priority of the corresponding components. Furthermore, unless otherwise defined, all terms including technical and scientific terms used herein have the same meaning as being generally understood by those having ordinary skill in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The term "module" used in various embodiments of the present disclosure may include a unit implemented with hardware, software, or firmware, and may be interchangeably used with terms, for example, "logic," "logic block," "part," or "circuitry". A module may be an integral part, or a minimum unit or portion thereof, adapted to perform one or more functions. In an embodiment, the module may be implemented in the form of an application-specific integrated circuit (ASIC). According to various embodiments, operations performed by the module, the program, or another component may be carried out sequentially, in parallel, or repeatedly, or one or more of the operations may be executed in a different order or omitted, or one or more other operations may be added.

Various embodiments of the present disclosure may be implemented as software (e.g., a program) including one or more instructions stored in a storage medium (e.g., an internal memory or an external memory) readable by a machine (e.g., a vehicle control device 100). For example, a processor (e.g., a processor 110) of the device (e.g., the vehicle control device 100) may invoke at least one of the stored one or more instructions from the storage medium and may execute it. This allows the machine to be operated to perform at least one function based on the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device and does not include a signal (e.g., an electromagnetic wave), but this term does not differentiate between where data is semi-permanently stored in the storage medium and where data is temporarily stored in the storage medium.

When a controller, component, device, element, part, unit, module, or the like of the present disclosure is described as having a purpose or performing an operation, function, or the like, the controller, component, device, element, part, unit, or module should be considered herein as being "configured to" meet that purpose or perform that operation or function. Each controller, component, device, element, part, unit, module, and the like may separately embody or be included with a processor and a memory, such as a non-transitory computer-readable media, as part of the apparatus.

Hereinafter, embodiments of the present disclosure are described in detail with reference to FIGS. 1-11.

FIG. 1 illustrates an example of a block diagram associated with a vehicle control device according to an embodiment of the present disclosure. Referring to FIG. 1, a vehicle control device 100 according to an embodiment of the present disclosure may be implemented inside or outside a vehicle. Some of the components included in the vehicle control device 100 may be implemented inside or outside the vehicle. In this case, the vehicle control device 100 may be integrally configured with control units in the vehicle or may be implemented as a separate device to be connected with the control units of the vehicle by a separate connection means. For example, the vehicle control device 100 may further include components which are not shown in FIG. 1.

The vehicle associated with the vehicle control device 100 according to an embodiment may include a hybrid electric vehicle (HEV). The HEV may include: an engine 145; a motor 140; an engine clutch for selectively connecting the engine 145 and the motor 140; a transmission; a differential gear device; a battery 130; a hybrid starter & generator (HSG) for starting the engine 145 or being generated by the output of the engine 145; and wheels. The HSG may be referred to as an integrated starter & generator (ISG). The vehicle control device 100 according to an embodiment may control the vehicle, based on a control mode including: an electric vehicle (EV) mode using power of the motor 140; an engine mode using power of the engine 145; an HEV mode for using power of the motor 140 as auxiliary power while using power of the engine 145 as main power; and/or a regenerative braking mode for collecting braking of the vehicle or braking upon driving (or operation) due to inertial and inertial energy through generation of the motor 140 to charge the battery 130.

Referring to FIG. 1, a vehicle control device 100 according to an embodiment may include at least one of a processor 110, a memory 120, a battery 130, the motor 140, the engine 145, a communication circuit 150, or a sensor 160. The processor 110, the memory 120, the battery 130, the motor 140, the engine 145, the communication circuit 150, and the sensor 160 may be electronically or operably coupled with each other by an electronic component including a communication bus.

Hereinafter, the pieces of hardware that are operably coupled with each other may include a direct connection or an indirect connection between the pieces of hardware that is established in a wired or wireless manner, such that second hardware is controlled by the first hardware among the pieces of hardware. The different blocks are illustrated, but an embodiment is not limited thereto. Some of the pieces of hardware of FIG. 1 may be included in a single integrated circuit including a system on a chip (SoC). Types of pieces of hardware included in the vehicle control device 100 or the number of the pieces of hardware are limited to those shown in FIG. 1. For example, the vehicle control device 100 may include only some of the pieces of hardware shown in FIG. 1. Components (e.g., a first neural network 121, a second neural network 122, and/or a third neural network 123) in the memory 120, which are described below, may be in a logically divided state. However, it is not limited thereto.

The vehicle control device 100 according to an embodiment may further include: a hybrid control unit (HCU) for controlling the overall operation of a hybrid electric vehicle (HEV); an engine control unit for controlling an operation of the engine 145; a motor control unit (MCU) for controlling an operation of the motor 140; a transmission control unit for controlling an operation of a transmission; and a battery control unit for controlling and managing the battery 130.

For example, the vehicle control device 100 may control starting of the engine 145 through a hybrid starter generator (HSG) in an idle state of the engine 145 using the HCU. The vehicle control device 100 may control the control units, such as the MCU connected with a network, such as a controller area network (CAN) which is a vehicle network, in an integrated manner using the HCU and may control the overall operation of the HEV. The vehicle control device 100 may control the HSG and the motor 140 using the MCU. The vehicle control device 100 may control an output torque of the motor 140 based on a control signal received from the HCU over the network, using the MCU, such that the motor 140 is able to be driven in an area with maximum efficiency. The MCU may include an inverter composed of a plurality of power switching elements. The power switching element constituting the inverter may include at least one of an insulated gate bipolar transistor (IGBT), a metal-oxide-semiconductor field-effect transistor (MOSFET), a field-effect transistor (FET), a transistor (TR), or a relay. The inverter may be used to convert a DC voltage supplied from the battery 130 into a 3-phase AC voltage to drive the motor 140.

The processor 110 of the vehicle control device 100 according to an embodiment may include a hardware component for processing data based on one or more instructions. The hardware for processing the data may include, for example, an arithmetic and logic unit (ALU), a floating point unit (FPU), a field programmable gate array (FPGA), a central processing unit (CPU), and/or an application processor (AP). The number of the processors 110 may be one or more in number. For example, the processor 110 may have a structure of a multi-core processor including a dual core, a quad core, a hexa core, or an octa core. The processor 110 may include a hybrid control unit (HEV), an engine control unit, a motor control unit (MCU), a transmission control unit, and/or a battery control unit.

The memory 120 of the vehicle control device 100 may include a hardware component for storing data and/or instructions input and/or output from the processor 110. The memory 120 may include, for example, a volatile memory, such as a random-access memory (RAM), and/or a non-volatile memory, such as a read-only memory (ROM). For example, the volatile memory may include at least one of a dynamic RAM (DRAM), a static RAM (SRAM)), a cache RAM, or a pseudo SRAM (PSRAM). For example, the non-volatile memory may include at least one of a programmable ROM (PROM), an erasable PROM (EPROM), an electrically erasable PROM (EEPROM), a flash memory, a hard disk, a compact disc, or an embedded multi-media card (eMMC).

The battery 130 of the vehicle control device 100 according to an embodiment may include a battery cell, a battery module, or a battery pack. For example, the battery 130 may be composed of one or more unit cells. The battery 130 may include a capacitor or a secondary battery, which stores power depending on charging. For example, the battery 130 may include any one of a lithium (Li)-ion battery, a Li-ion polymer battery, a lead-acid battery, a nickel-cadmium (NiCd) battery, or a nickel-metal hydride (NiMH) battery. The battery 130 may supply electricity to the motor 140 in the EV mode and the HEV mode and may be charged through electricity collected through the motor 140 in the regenerative braking mode.

The motor 140 of the vehicle control device 100 according to an embodiment may operate depending on a 3-phase AC voltage output from the MCU to generate torque. For example, the motor 140 may supply regenerative energy to the battery 130, based on coasting drive or regenerative braking.

According to an embodiment, the communication circuit 150 of the vehicle control device 100 may include hardware for supporting the transmission or reception of an electrical signal between the vehicle control device 100 and an external electronic device (e.g., a server and/or an external vehicle control device different from the vehicle control device 100). For example, the communication circuit 150 may include at least one of a modem, an antenna, or an optic/electronic (O/E) converter. The communication circuit 150 may support transmission and or reception of an electrical signal based on various types of protocols such as an Ethernet for vehicle, a controller area network (CAN), a local interconnect network (LIN), FlexRay, a local area network (LAN), a wide area network (WAN), wireless fidelity (Wi-Fi), Bluetooth, Bluetooth low energy (BLE), ZigBee, long term evolution (LTE), a thread, a matter, and 5th generation new radio (5G NR).

The vehicle control device 100 according to an embodiment may receive map information (or navigation information) from the external server through the communication circuit 150. The map information may include information about a grade degree of a road included in three-dimensional (3D) map data, information about a speed limit, and/or information about a traffic speed included in transport protocol expert group (TPEG) data.

The sensor 160 of the vehicle control device 100 according to an embodiment may generate electrical information capable of being processed by the processor 110 and/or the memory 120 of the vehicle control device 100, from non-electronic information associated with the vehicle control device 100.

According to an embodiment, the sensor 160 may include one or more sensors. For example, the sensors 160 may be attached to different positions of the vehicle. The sensors 160 may face one or more different directions. For example, the sensors 160 may be attached to the front, sides, rear, and/or roof of the vehicle to face directions, such as forward-facing, rear-facing, and side-facing.

In an embodiment, the sensors 160 may be image sensors such as high dynamic range cameras. For example, the sensors 160 may include non-visual sensors. For example, the sensors 160 may include radio detection and ranging (PADAR), light detection and ranging (LiDAR), and/or an ultrasonic sensor, other than an image sensor.

In an embodiment, the sensors 160 may include: a posture sensor (e.g., a yaw sensor, a roll sensor, or a pitch sensor); a collision sensor; a wheel sensor; a speed sensor; a tilt sensor; a weight sensor; a heading sensor; a gyro sensor; a position module; a moving object forward/backward sensor; a battery sensor; a fuel sensor; a tire sensor; a steering sensor based on steering wheel rotation; a moving object internal temperature sensor; a moving object internal humidity sensor; an ultrasonic sensor; an illumination sensor; an accelerator pedal position sensor; and/or a brake pedal position sensor. For example, the vehicle control device 100 may obtain sensing data for moving object posture information, moving object collision information, moving object direction information, moving object position information (or GPS information), moving object angle information, moving object speed information, moving object acceleration information, moving object tilt information, moving object forward/backward information, battery information, fuel information, tire information, moving object lamp information, moving object internal temperature information, moving object internal humidity information, a steering wheel rotation angle, moving object external illumination, pressure applied to the accelerator pedal, and/or pressure applied to the brake pedal.

The vehicle control device 100 according to an embodiment may control notification systems including warning systems for notifying a driver of driving events, such as an approach to a destination or a potential collision. For example, the vehicle control device 100 may adjust the sensor 160 of the vehicle. For example, the vehicle control device 100 may modify an orientation of the sensor 160. The vehicle control device 100 may change output resolution and/or a format type of the sensor 160. The vehicle control device 100 may change (e.g., increase or decrease) a capture rate. The vehicle control device 100 may adjust a dynamic range of the sensor 160. The vehicle control device 100 may individually or collectively control (e.g., turn on or turn off) an operation of the sensor 160.

The vehicle control device 100 according to an embodiment may perform a deep learning analysis of sensor data received from the sensor 160. The vehicle control device 100 may be coupled to the memory 120 configured to provide a process including instructions causing to determine a deep learning result used to operate the vehicle at least partially autonomously, through an input/output interface. For example, the vehicle control device 100 may process commands for vehicle control, which are output from the processor 110. The vehicle control device 100 may translate an output of the processor 110 into instructions for controlling modules of the vehicle to control various modules of the vehicle.

The vehicle control device 100 according to an embodiment may control the vehicle. For example, the vehicle control device 100 may adjust the steering and/or speed of the vehicle. For example, the vehicle control device 100 may perform deceleration, acceleration, steering, lane change, and/or lane keeping to control the driving of the vehicle. For example, the vehicle control device 100 may generate control signals for controlling vehicle lighting including at least one of the brake lights, turn signals, and/or headlights. In some embodiments, the vehicle control device 100 may control audio-related systems including a vehicle's sound system, vehicle's audio warnings, a vehicle's microphone system, and/or a vehicle's horn system.

The vehicle control device 100 according to an embodiment may control the vehicle based on an autonomous driving mode. The autonomous driving mode of the vehicle may include a driver assistance function (e.g., an advanced driver assistance system (ADAS)) of the vehicle. The autonomous driving mode of the vehicle may include adaptive cruise control (ACC) and/or smart cruise control (SCC). However, it is not limited thereto.

The vehicle control device 100 according to an embodiment may identify an input indicating execution of the autonomous driving mode. The vehicle control device 100 may control the vehicle on which the vehicle control device 100 is mounted, based on the autonomous driving mode. The vehicle may be driven by the vehicle control device 100, based on the autonomous driving mode.

According to an embodiment, the vehicle control device 100 may perform global path planning corresponding to a destination. The vehicle control device 100 may receive an input indicating the destination, from a user (or a driver) of the vehicle control device 100. For example, the vehicle control device 100 may obtain location information (or map information) about the vehicle control device 100, from at least one server through the communication circuit 150. Based on the location information, the vehicle control device 100 may identify a driving path indicating a current location (e.g., a starting point) of the vehicle and the destination. The vehicle control device 100 may control the driving of the vehicle, based on the identified driving path. For example, the vehicle control device 100 may perform global path planning using the location information, thus providing the user with a distance of the driving path and/or a driving time.

According to an embodiment, the vehicle control device 100 may perform local path planning, using the sensor 160, in the state in which the global path planning is performed.

For example, the vehicle control device 100 may identify a surrounding environment of the vehicle control device 100 and/or the vehicle on which the vehicle control device 100 is mounted, using the sensor 160. For example, the vehicle control device 100 may identify a surrounding environment, using a camera (not shown). The vehicle control device 100 may change the local path planning, based on the surrounding environment. The vehicle control device 100 may change the local path planning, thus adjusting at least a portion of the driving path. For example, the vehicle control device 100 may control the vehicle to make a lane change, based on the changed local path planning. For example, the vehicle control device 100 may control a speed of the vehicle, based on the changed local path planning.

One or more instructions indicating calculation and/or an operation to be performed for data by the processor 110 of the vehicle control device 100 may be stored in the memory 120 of the vehicle control device 100 according to an embodiment. A set of the one or more instructions may be referred to as firmware, an operating system, a process, a routine, a sub-routine, and/or an application. For example, when a set of a plurality of instructions distributed in the form of an operating system, firmware, a driver, and/or an application is executed, the vehicle control device 100 and/or the processor 110 may perform at least one of operations of FIGS. 10 and 11.

A set of parameters associated with the first neural network 121, the second neural network 122, and/or the third neural network 123 may be stored in the memory 120 of the vehicle control device 100 according to an embodiment. The first neural network 121, the second neural network 122, and/or the third neural network 123 may be a recognition model implemented with software or hardware that simulates a calculation capability of a biological system using a large number of artificial neurons (or nodes). The first neural network 121, the second neural network 122, and/or the third neural network 123 may perform a human cognitive operation or a learning process using artificial neurons. The parameters associated with the first neural network 121, the second neural network 122, and/or the third neural network 123 may indicate, for example, weights assigned to a plurality of nodes included in the first neural network 121, the second neural network 122, and/or the third neural network 123 and/or connections between the plurality of nodes.

A description is given below of a structure of the first neural network 121, the second neural network 122, and/or the third neural network 123 indicating the set of parameters stored in the memory 120 of the vehicle control device 100 according to an embodiment with reference to FIG. 2. The number of the first neural network 121, the second neural network 122, and/or the third neural network 123 stored in the memory 120 is not limited to that shown in FIG. 1. Sets of parameters corresponding to each of the first neural network 121, the second neural network 122, and/or the third neural network 123 may be stored in the memory 120.

In an embodiment, the vehicle control device 100 may predict a change in the speed of the vehicle based on the route of the vehicle, using the map information (or the navigation information) received through the communication circuit 150, by the first neural network 121. The vehicle control device 100 may divide the route of the vehicle into a plurality of partial routes, using the change in speed of the vehicle. As an example, the vehicle control device 100 may divide the route of the vehicle into the plurality of partial routes, using grade information. The vehicle control device 100 may obtain state of charge (SOC) information of the battery 130, which changes based on the change in speed of the vehicle. The vehicle control device 100 may obtain ratio information between a transit time when the vehicle passes through each partial route of the plurality of partial routes and a driving time of the vehicle based on the HEV mode in each partial route of the plurality of partial routes, using the SOC information of the battery 130.

In an embodiment, the vehicle control device 100 may identify (or predict) acceleration of the vehicle in a partial route in which the vehicle is located among the plurality of partial routes, using sensing data (or sensor information) obtained from the sensor 160, by the second neural network 122. For example, the sensing data may include at least one of a relative position between the vehicle including the vehicle control device 100 and another vehicle, and/or a relative speed of the other vehicle with respect to the vehicle.

In an embodiment, the vehicle control device 100 may predict the power necessary to obtain the identified acceleration, by the third neural network 123. The vehicle control device 100 may predict a speed of the vehicle, which may be obtained based on the identified acceleration, by the third neural network 123. The vehicle control device 100 may obtain fuel consumption information, using at least one of power information indicating the predicted power, speed information indicating the predicted speed of the vehicle, the ratio information, or any combination thereof. The fuel consumption information may include information for minimizing fuel consumed while the vehicle is driving along the route. The vehicle control device 100 may control the vehicle along the vehicle to minimize fuel to be consumed, based on the EV mode or the HEV mode, using the obtained fuel consumption information.

As described above, the vehicle control device 100 according to an embodiment may predict SOC progress for each section for a plurality of sections, based on a model prediction control optimization technique. The vehicle control device 100 may perform power distribution for controlling the vehicle, using the predicted SOC progress. The vehicle control device 100 may optimize the global path planning and the local path planning, using long-distance prediction information (e.g., global information), such as map information, and near-future prediction information (e.g., local information), such as sensing data, thus improving fuel efficiency for controlling the vehicle. Furthermore, the vehicle control device 100 may predict SOC progress for each section in multiple sections, thus improving fuel efficiency for controlling the vehicle on a flat road, as well as a road including a hill.

Figure 2:
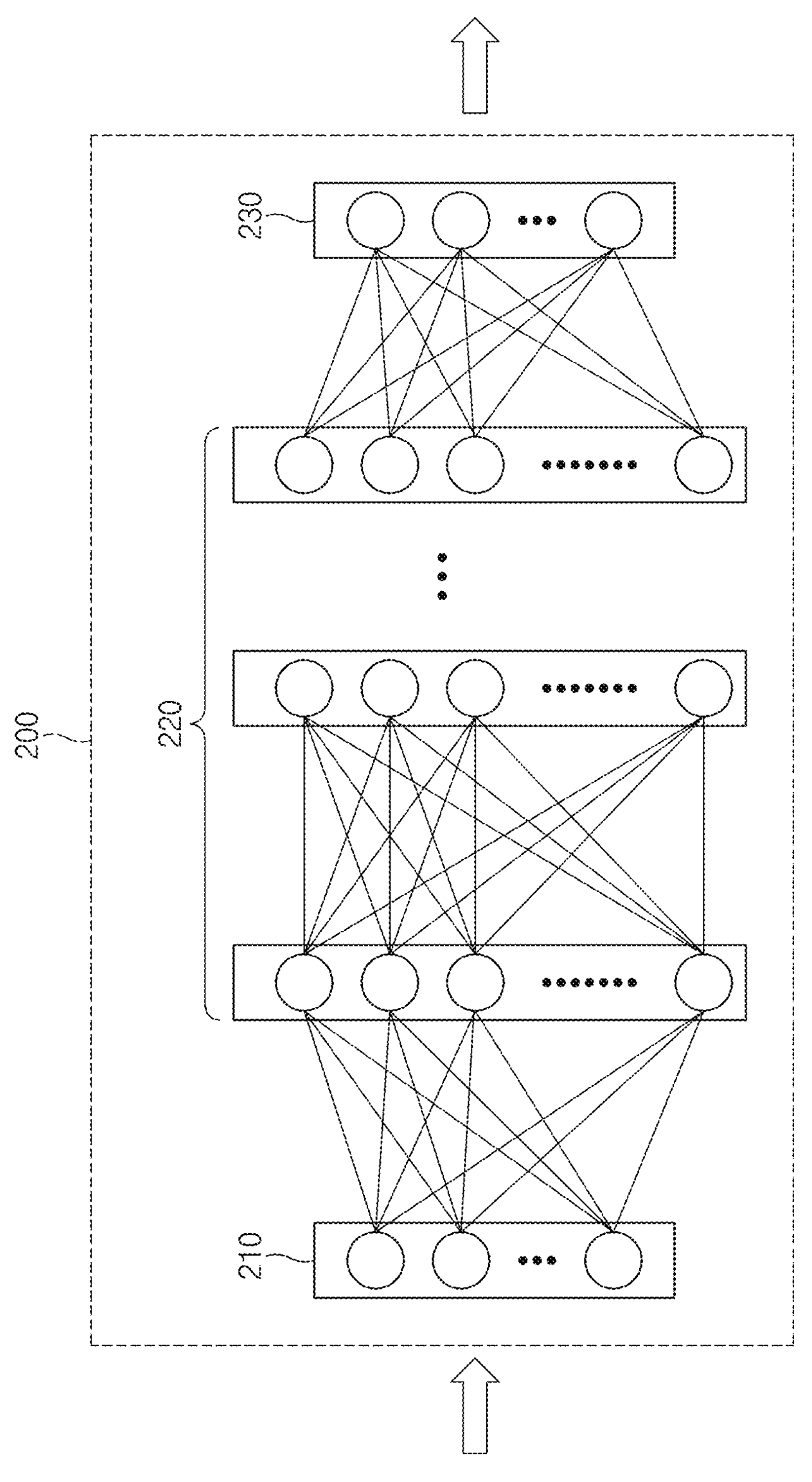
FIG. 2 illustrates an example neural network obtained from a set of parameters stored in a memory by a vehicle control device according to an embodiment of the present disclosure.

FIG. 2 illustrates an example for describing a neural network obtained from a set of parameters stored in a memory by a vehicle control device according to an embodiment of the present disclosure. Referring to FIG. 2, at least a portion of a neural network 200 may include a plurality of layers. For example, the neural network 200 may include a first neural network 121, a second neural network 122, and/or a third neural network 123 of FIG. 1.

For example, the neural network 200 may include an input layer 210, one or more hidden layers 220, and an output layer 230. The input layer 210 may receive a vector indicating input data (e.g., a vector with elements corresponding to the number of nodes included in the input layer 210). Signals generated at each of the nodes in the input layer 210, which are generated by the input data, may be transmitted from the input layer 210 to the hidden layers 220. The output layer 230 may generate output data of the neural network 200, based on one or more signals received from the hidden layers 220. The output data may include, for example, a vector with elements corresponding to the number of the nodes included in the output layer 230.

Referring to FIG. 2, the one or more hidden layers 220 may be located between the input layer 210 and the output layer 230 and may convert input data delivered through the input layer 210 into a value easy to be predicted. The input layer 210, the one or more hidden layers 220, and the output layer 230 may include a plurality of nodes. The one or more hidden layers 220 are not limited to a shown feedforward-based topology, which may be, for example, a convolution filter or a fully connected layer in a convolutional neural network (CNN) or various types of filers or layers bound based on a special function or feature. In an embodiment, the one or more hidden layers 220 may be layers based on a recurrent neural network (RNN), an output value of which is input again to the hidden layer in a current time. As an example, the input layer 210, the one or more hidden layers 220, and/or the output layer 230 may be some layers of a transformer model.

In an embodiment, the neural network 200 may include numerous hidden layers 220 and may form a deep neural network. Training the deep neural network refers to deep learning. A node included in the hidden layers 220 among the nodes of the neural network 200 refers to a hidden node.

In an embodiment, nodes included in the input layer 210 and the one or more hidden layers 220 may be connected with each other through a connection edge with a connection weight. Additionally, nodes included in the hidden layer and the output layer may also be connected with each other through the connection edge with the connection weight. Tuning and/or training the neural network 200 may refer to changing a connection weight between nodes included in each of the layers (e.g., the input layer 210, the one or more hidden layers 220, and the output layer 230) included in the neural network 200. The tuning of the neural network 200 may be performed based on, for example, supervised learning, unsupervised learning, and/or adversarial learning.

Figure 3:
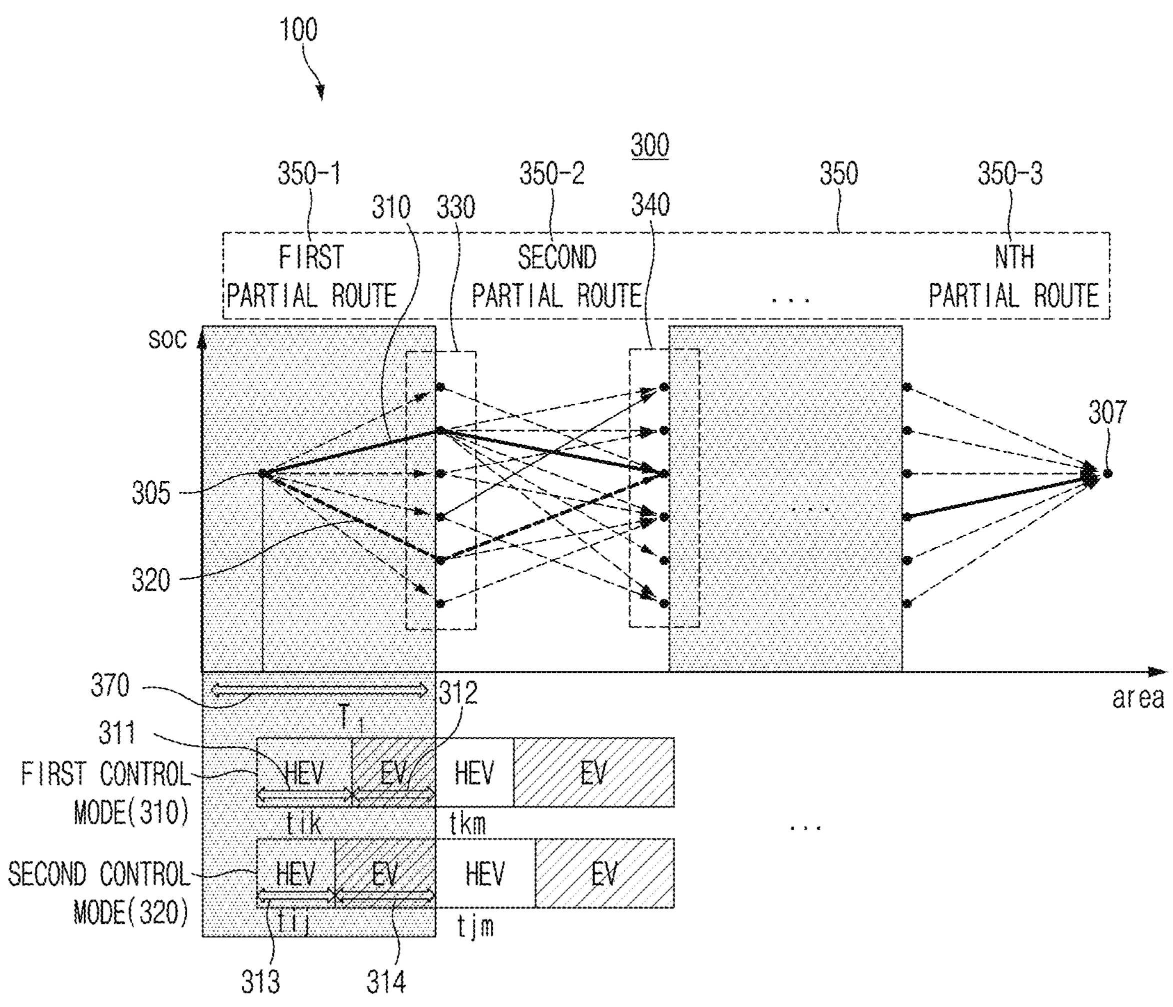
FIG. 3 illustrates an example operation of obtaining hybrid electric vehicle (HEV) ratio information in a vehicle control device according to an embodiment of the present disclosure.
Figure 4:
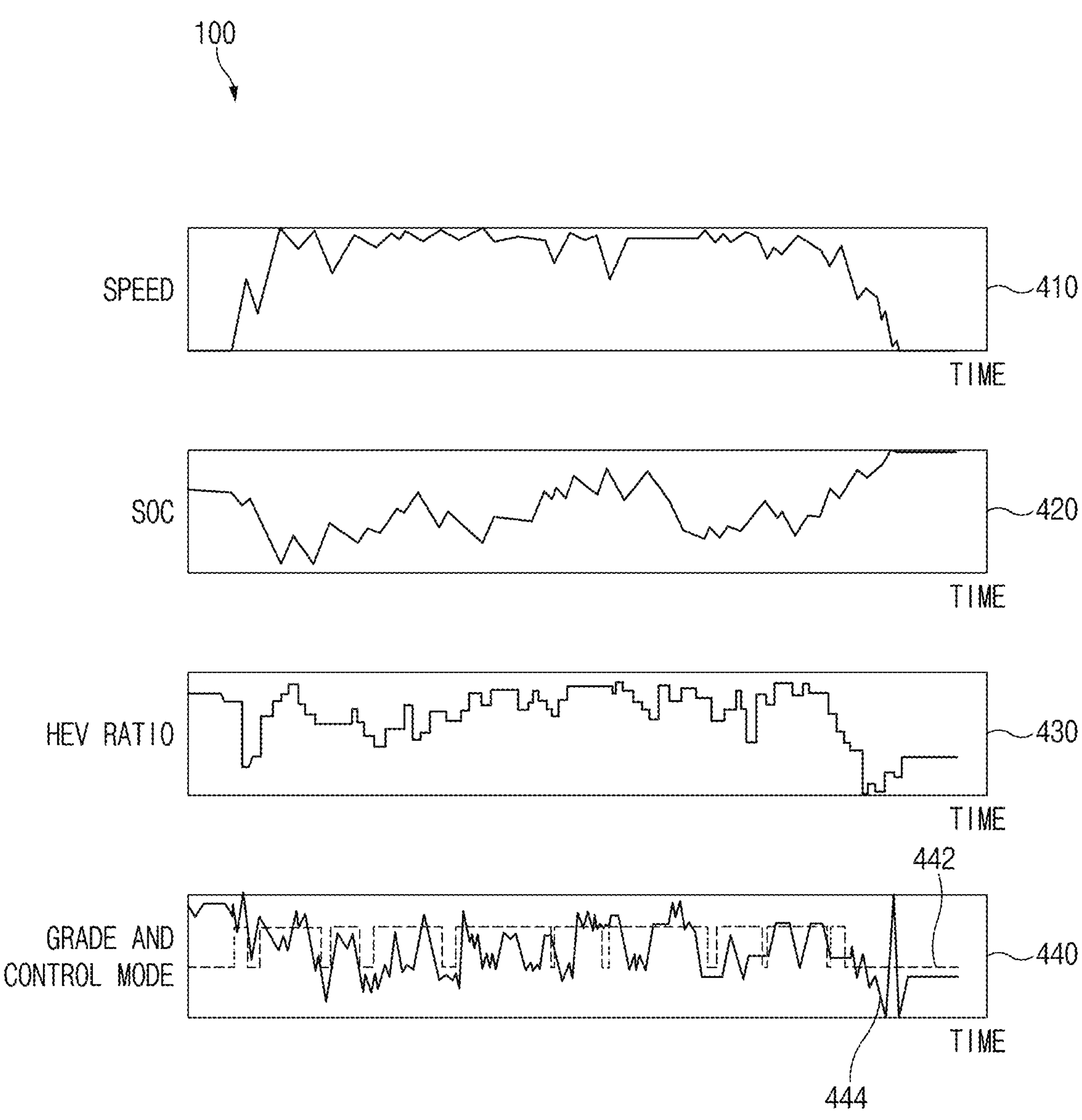
FIG. 4 is a graph illustrating information obtained by a vehicle control device according to an embodiment of the present disclosure.

FIG. 3 illustrates an example 300 for describing an operation of obtaining hybrid electric vehicle (HEV) ratio information in a vehicle control device according to an embodiment of the present disclosure. FIG. 4 is a graph illustrating information obtained by a vehicle control device according to an embodiment of the present disclosure. A vehicle control device 100 of FIG. 3 may be referred to a vehicle control device 100 of FIG. 1.

Referring to FIG. 3, the vehicle control device 100 according to an embodiment may receive map information through a communication circuit (e.g., a communication circuit 150 of FIG. 1) from an external server. For example, the vehicle control device 100 may receive map information about a route from a current location of a vehicle to another location (e.g., a destination). The map information may include at least one of grade information (or flat road information) of a road corresponding to the route, a speed limit of the road, traffic volume on the road, a current average speed of the vehicle, or any combination thereof. For example, the vehicle control device 100 may control the vehicle on which the vehicle control device 100 is mounted, based on an autonomous driving mode. Referring to FIG. 4, the map information may include grade information corresponding to a graph 444 illustrating a grade degree, on a fourth graph 440.

Referring to FIG. 3, while driving the vehicle, the vehicle control device 100 according to an embodiment may predict a change in speed of the vehicle based on the route of the vehicle, using the received map information. For example, the vehicle control device 100 may predict a change in a speed of the vehicle, using a first neural network 121 of FIG. 1. The vehicle control device 100 may predict a driving load of the vehicle, using map information including information indicating a road type, a grade degree, and/or a speed limit, and/or vehicle-to-infrastructure (V2I) connectivity information indicating traffic volume, weather, or whether an accident occurs. For example, the vehicle control device 100 may predict a driving load of the vehicle, using information indicating a driving tendency of a driver. The information indicating the driving tendency of the driver may include information about a driving habit of the driver (e.g., an acceleration tendency, deceleration tendency, and/or an average speed offset). Referring to FIG. 4, the vehicle control device 100 may predict a change in speed of the vehicle like a first graph 410 illustrating a change in speed over time.

Referring to FIG. 3, the vehicle control device 100 according to an embodiment may divide the route of the vehicle into a plurality of partial routes 350, using the change in speed of the vehicle, by the first neural network 121 of FIG. 1. The vehicle control device 100 may identify an average speed of the vehicle, which follows the change in speed of the vehicle, in each partial route of the plurality of partial routes 350. The vehicle control device 100 may divide the plurality of partial routes 350 depending on the average speed of the vehicle. The vehicle control device 100 may identify a transit time (e.g., a transit time 370) when the vehicle passes through each partial route of the plurality of partial routes 350 based on the average speed of the vehicle, which follows the change in speed of the vehicle. However, it is not limited thereto. The transit time may include a first time (e.g., a first time 311) when the vehicle is driven based on a first mode (e.g., an HEV mode) and a second time (e.g., a second time 312) when the vehicle is driven based on a second mode (e.g., an EV mode).

Referring to FIG. 3, the vehicle control device 100 according to an embodiment may obtain state of charge (SOC) information indicating a SOC of a battery, which corresponds to the average speed of the vehicle, in each partial route of the plurality of partial routes 350. Referring to FIG. 4, a second graph 420 may illustrate a change in SOC over time. The SOC may change based on the change in speed of the vehicle. For example, the vehicle control device 100 may obtain information indicating the SOC based on the change in speed of the vehicle, like the second graph 420.

Referring again to FIG. 3, for example, the vehicle control device 100 may obtain SOC information of the battery, which may change based on the change in speed of the vehicle, in each partial route of the plurality of partial routes 350. The vehicle control device 100 may identify a first SOC 305 of the vehicle at the current location, using the SOC information. The vehicle control device 100 may infer a second SOC 307 of the vehicle at another location, using the SOC information.

The vehicle control device 100 according to an embodiment may determine a mode for driving the vehicle, such that the SOC of the battery, which corresponds to the first SOC 305, matches the second SOC 307 after driving the vehicle along the plurality of partial routes 350. For example, the vehicle control device 100 may adjust a ratio for controlling the vehicle based on the first mode (e.g., the HEV mode) or the second mode (e.g., the EV mode), thus determining the mode for driving the vehicle, such that the SOC of the battery match the second SOC 307 after driving the vehicle along the plurality of partial routes 350.

The vehicle control device 100 according to an embodiment may determine the mode for driving the vehicle using cost (or loss functions) 330 and 340 corresponding to each of the plurality of partial routes 350, by the first neural network 121 of FIG. 1. The first neural network 121 of FIG. 1 may include a dynamic programming (DP) algorithm. The DP algorithm (or technique) may be one of the global optimization techniques based on Bellman's Principle of Optimality.

The vehicle control device 100 according to an embodiment may identify a control mode for minimizing fuel consumption (or energy consumption) between a first control mode 310 and a second control mode 320, using the cost 330 and 340 corresponding to each of the plurality of partial routes 350.

In an embodiment, the cost 330 and 340 may indicate an amount of fuel consumption (or an amount of energy) corresponding to each of the plurality of partial routes 350. For example, the first cost 330 may refer to variables indicating values for a plurality of SOCs corresponding to a first partial route 350-1 among the plurality of partial routes 350. As an example, the first cost 330 may indicate SOC values for minimizing fuel consumption, in the first partial route 350-1. The second cost 340 may refer to variables indicating values for a plurality of SOCs corresponding to a second partial route 350-2 among the plurality of partial routes 350.

The vehicle control device 100 according to an embodiment may select at least one of the first control mode 310 or the second control mode 320, using engine information indicating whether to drive an engine (e.g., an engine 145 of FIG. 1). The engine information may indicate whether to drive the engine corresponding to the partial routes. The engine information may indicate whether to drive the engine over time. However, it is not limited thereto. The vehicle control device 100 may select at least one of the first cost 330, using the engine information, and may select at least one of the second cost 340, using the engine information. The vehicle control device 100 may use costs corresponding to each of the plurality of partial routes 350 to select a control mode for minimizing fuel consumption. For example, the vehicle control device 100 may select the control mode for minimizing the fuel consumption, using Equation 1 described below.

$$fNm = \mathrm{Min}(t_{ik} * fu1 + \ldots + t_{km} * fuN,\ t_{ij} * fu1 + \ldots + t_{jm} * fuN) \quad \text{[Equation 1]}$$

Referring to Equation 1 above, fNm may indicate the minimum value of the amount of fuel consumption. $t_{ik}$ may refer to the first time 311 when the vehicle is driven based on the first mode (e.g., the HEV mode) in the first partial route 350-1 in the first control mode 310. fu1 may indicate the amount of fuel consumption consumed during the first time 311. $t_{km}$ may refer to the time when the vehicle is driven based on the first mode, in the second partial route 350-2 in the first mode 310. fuN may indicate the amount of fuel consumption consumed on the Nth partial route (e.g., the second partial route 350-2) in the first mode 310. For example, $t_{ij}$ may refer to a first time 313 when the vehicle is driven based on the first mode, in the first partial route 350-1 in the second mode 320. $t_{jm}$ may refer to the second time 314 when the vehicle is driven based on the first mode, in the second partial route 350-2 in the second mode 320. The vehicle control device 100 may select a control mode in which the amount of fuel consumption is minimized, in the last partial route among the partial routes, using Equation 1 above. As an example, the vehicle control device 100 may select the first control mode 310 in which the amount of fuel consumption is minimized in the last partial route (e.g., an Nth partial route 350-3) among the plurality of partial routes 350. However, it is not limited thereto.

The vehicle control device 100 according to an embodiment may obtain ratio information corresponding to the plurality of partial routes 350. The ratio information may be represented as a third graph 430 of FIG. 4.

For example, the vehicle control device 100 may obtain ratio information between a transit time (e.g., a transit time 370) when the vehicle passes through each of the plurality of partial routes 350 and a driving time of the vehicle based on the first mode (e.g., the HEV mode) in each of the plurality of partial routes 350. The ratio information may indicate a degree to a time when the engine is driven based on the transit time. As an example, sub-ratio information corresponding to the first partial route 350-1 may be represented as Equation 2 below.

$$HEV \text{ ratio} = \frac{t_{ik}}{T_1} \quad \text{[Equation 2]}$$

Referring to Equation 2 above, $T_1$ may indicate the transit time 370. For example, the vehicle control device 100 may control the vehicle based on the first mode (e.g., the HEV mode) or the second mode (e.g., the EV mode), depending on a partial route (e.g., the first partial route 350-1) in which the vehicle is located, using sub-ratio information (e.g., an HEV ratio of Equation 2 above) corresponding to the partial route (e.g., the first partial route 350-1) in which the vehicle is located in the ratio information.

Referring to FIG. 4, the vehicle control device 100 according to an embodiment may control the vehicle based on at least one of the first mode or the second mode, using data corresponding to a graph 442 illustrating a vehicle control mode included in the fourth graph 440.

As described above, the vehicle control device 100 according to an embodiment may obtain the ratio information about the partial route in which the vehicle is located among the plurality of partial routes. As a result, the vehicle control device 100 may select the HEV mode or the EV mode and control the vehicle to minimize fuel consumption while driving the vehicle along the route using the ratio information. The vehicle control device 100 may use the partial routes in an integrated manner, thus reducing an amount of calculation for obtaining the ratio information.

Hereinafter, a description is given of an operation of controlling the vehicle using the ratio information in the vehicle control device 100 with reference to FIG. 5.

Figure 5:
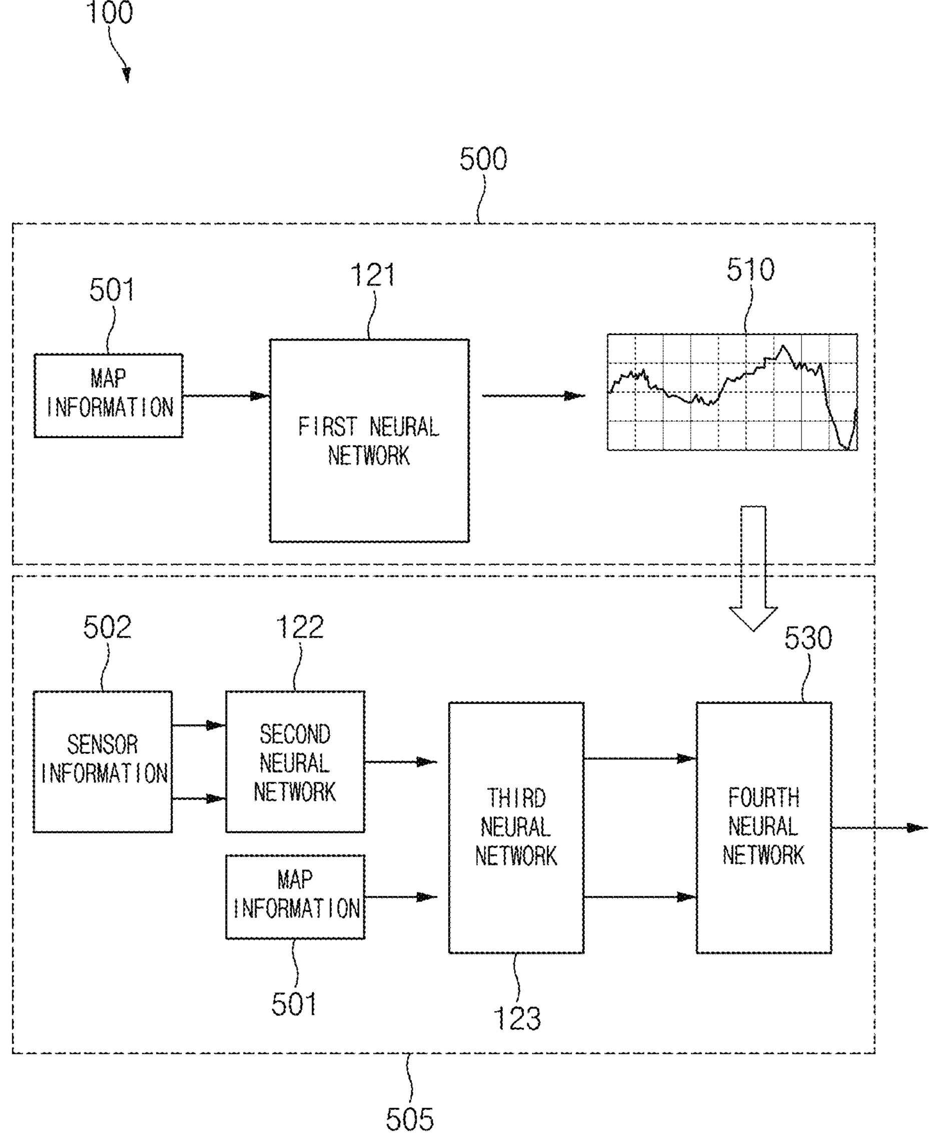
FIG. 5 illustrates an example of selecting a control mode for controlling a vehicle in a vehicle control device according to an embodiment of the present disclosure.
Figure 6:
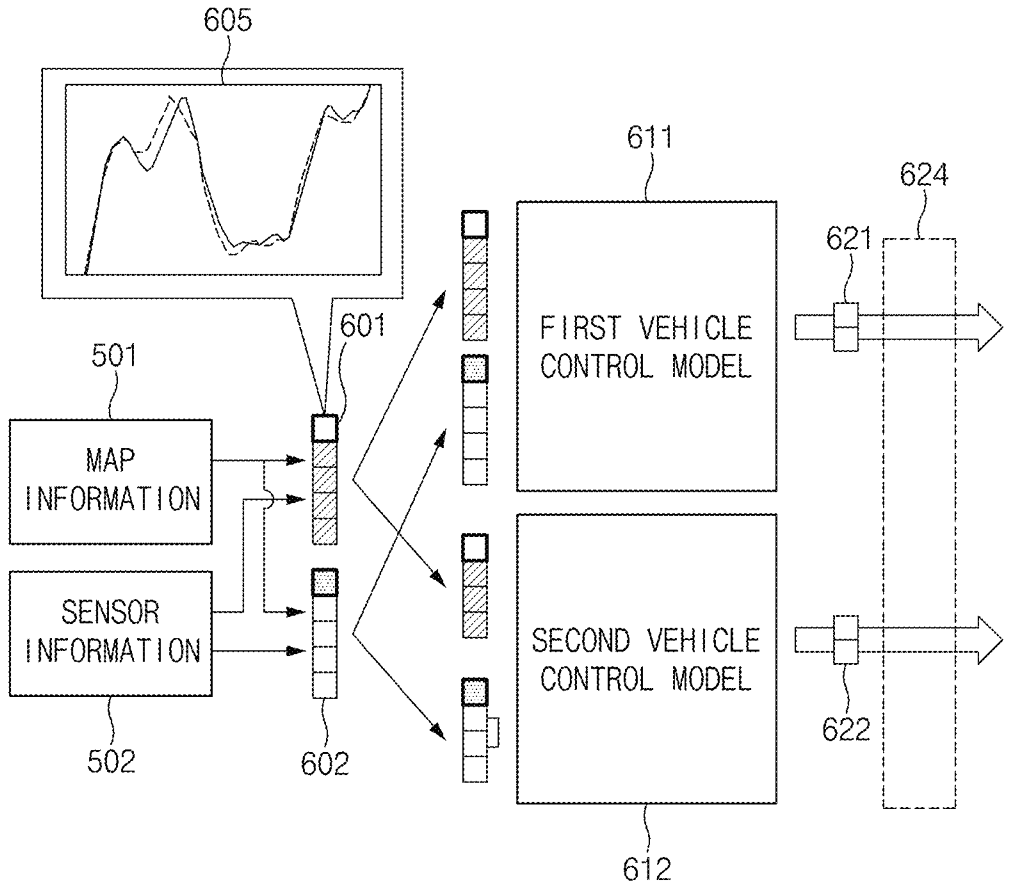
FIG. 6 illustrates an example operation of obtaining fuel consumption information in a vehicle control device according to an embodiment of the present disclosure.

FIG. 5 illustrates an example of an operation of selecting a control mode for controlling a vehicle in a vehicle control device according to an embodiment of the present disclosure. FIG. 6 illustrates an example describing an operation of obtaining fuel consumption information in a vehicle control device according to an embodiment of the present disclosure. A vehicle control device 100 of FIGS. 5 and 6 may be referred to a vehicle control device 100 of FIG. 1.

Referring to FIG. 5, the vehicle control device 100 according to an embodiment may obtain ratio information 510, by a first neural network 121 to which map information 501 (or average speed information) is input, in a first layer 500. The ratio information 510 may include sub-ratio information about a partial route in which the vehicle is located among a plurality of partial routes (e.g., a plurality of partial routes 350 of FIG. 3).

In an embodiment, the first layer 500 may be referred to as an upper layer, in terms of obtaining ratio information, before the vehicle control device 100 controls the vehicle. The operation performed in the first layer 500 by the vehicle control device 100 may be associated with global path planning, in terms of using map information. The first layer 500 may include a dynamic programming algorithm.

In an embodiment, a second layer 505 may be referred to as a lower layer, in terms of using the ratio information obtained in the first layer 500. The operation performed in the second layer 505 by the vehicle control device 100 may be associated with local path planning, in terms of using sensor information 502. The operation performed through the first layer 500 by the vehicle control device 100 and the operation performed through the second layer 505 by the vehicle control device 100 may be performed in parallel.

Referring to FIG. 5, in the second layer 505, the vehicle control device 100 according to an embodiment may predict acceleration, by a second neural network 122 to which the sensor information 502 is input. The sensor information 502 may include at least one of a relation location between the vehicle including the vehicle control device 100 and another vehicle (e.g., a forward vehicle) and/or a relative speed of the other vehicle with respect to the vehicle. The second neural network 122 may be referred to as an acceleration prediction model, in terms of including an algorithm for predicting acceleration.

Referring to FIG. 5, the vehicle control device 100 according to an embodiment may predict the power necessary to obtain the speed and acceleration of the vehicle, which may be obtained based on the predicated acceleration, by a third neural network 123, using the acceleration. For example, the vehicle control device 100 may predict power and speed, using the map information 501. The third neural network 123 may be referred to as a vehicle required power model, in terms of including an algorithm for predicting required power.

Referring to FIG. 5, the vehicle control device 100 according to an embodiment may obtain fuel consumption information, using at least one of power information indicating the predicted power, speed information indicating a speed of the vehicle, ratio information obtained in the first layer 500, or any combination thereof, by a fourth neural network 530.

Referring to FIG. 5, in an embodiment, the fuel consumption information may include information about fuel to be consumed if driving the vehicle based on a first mode (e.g., an HEV mode) and information about fuel to be consumed if driving the vehicle based on a second mode (e.g., an EV mode). A description will be given below of the operation of obtaining the fuel consumption information in the vehicle control device 100 with reference to FIG. 6. The fourth neural network 530 may include vehicle control models (e.g., an EV control mode or an HEV control model) capable of controlling the vehicle based on the first mode or the second mode.

Referring to FIG. 6, the vehicle control device 100 according to an embodiment may obtain power information 601 and/or speed information 602 corresponding to acceleration predicted by the second neural network 122, using the map information 501 and/or the sensor information 502. The power information 601 may indicate power (or output) over time as depicted in a graph 605. For example, the vehicle control device 100 may input the power information 601 and the speed information 602 to a first vehicle control model 611 and/or a second vehicle control model 612.

According to an embodiment, the vehicle control device 100 may obtain the power information 601, using Equation 3 below.

$$P = \dot{v} * \dot{t} \qquad \text{[Equation 3]}$$

Referring to Equation 3 above, P may indicate the power required to obtain acceleration. $\dot{v}$ may indicate the wheel speed of the vehicle, which corresponds to the power. $\dot{t}$ may indicate the wheel torque of the vehicle, which corresponds to the power. The wheel torque may be associated with acceleration, a rolling resistance coefficient (RRC) of a wheel of the vehicle, an aerodynamic coefficient, and/or an equivalent test weight (ETW). The RRC may indicate a frictional force between the wheel and the ground. The aerodynamic coefficient may indicate air resistance against the vehicle. The ETW may indicate an equivalent test weight of the vehicle, which is used to analyze a driving characteristic.

In an embodiment, the first vehicle control model 611 and a second vehicle control model 612 may be included in the fourth neural network 530 of FIG. 5. The first vehicle control model 611 may correspond to a plant model for controlling the vehicle based on the HEV mode. The second vehicle control model 612 may correspond to a plant model for controlling the vehicle based on the EV mode. The first vehicle control model 611 and the second vehicle control model 612 may include power distribution logic of the plant model and information indicating efficiency of an output to inputs of electronic devices (e.g., a motor, a battery, and an engine) for outputting power.

In an embodiment, the vehicle control device 100 may predict a first energy amount 621 (or a first fuel consumption amount) to be consumed when controlling the vehicle along at least a portion of the route based on the first mode (e.g., the HEV mode), by the first vehicle control model 611 to which the power information 601 and the speed information 602 are input. The first energy amount 621 may include information about the SOC of the battery. The vehicle control device 100 may calculate the first energy amount 621 including SOC information indicating an SOC of the battery, which may change depending on controlling the vehicle based on the first mode.

For example, the vehicle control device 100 may correct the first energy amount 621 using ratio information 624. The ratio information 624 may be referred to the ratio information 510 of FIG. 5. For example, the vehicle control device 100 may obtain the first energy amount 621, using the power information 601, the speed information 602, and/or the ratio information 624. As an example, the first energy amount 621 may include information about fuel to be consumed when driving the vehicle based on the first mode, in an autonomous driving state of the vehicle control device 100. The autonomous driving state may include an ADAS horizon state.

In an embodiment, the vehicle control device 100 may predict a second energy amount 622 (or a second fuel consumption amount) to be consumed when controlling the vehicle along at least a portion of the route based on the second mode (e.g., the EV mode), by the second vehicle control model 612 to which the power information 601 and the speed information 602 are input. The second energy amount 622 may include information about an SOC of the battery. The vehicle control device 100 may calculate the second energy amount 622 including SOC information indicating an SOC of the battery, which may change depending on controlling the vehicle based on the second mode. As an example, when controlling the vehicle based on the second mode, because the driving of the engine is able to be turned off, there may be no fuel consumed to control the vehicle.

The vehicle control device 100 according to an embodiment may obtain fuel consumption information for minimizing fuel to be consumed when driving the vehicle along the route, using the first energy amount 621 and the second energy amount 622. The vehicle control device 100 may control the vehicle along the route based on the first mode (e.g., the HEV mode) or the second mode (e.g., the EV mode), using the fuel consumption information. The vehicle control device 100 may control the vehicle, based on a mode for minimizing an amount of increase in fuel compared to an amount of increase in SOC between the first mode (e.g., the HEV mode) and the second mode (e.g., the EV mode), using the fuel consumption information.

As described above, the vehicle control device 100 according to an embodiment may minimize fuel consumption, while controlling the vehicle along the route, using the first layer 500 for obtaining the ratio information 510 and the second layer 505 for selecting the control mode for selecting the vehicle. The vehicle control device 100 may obtain the ratio information 510, using macro information (e.g., map information) between the route and the vehicle, in the first layer 500 and may obtain fuel consumption information, using micro-information (e.g., sensor information) between the vehicle and a forward vehicle, in the second layer 505. The vehicle control device 100 may use the macro information and the micro-information in an integrated manner, thus optimizing an SOC operation strategy.

Figure 7A:
FIGS. 7A and 7B illustrate example fuel consumption information obtained by a vehicle control device according to an embodiment of the present disclosure.
Figure 7A:
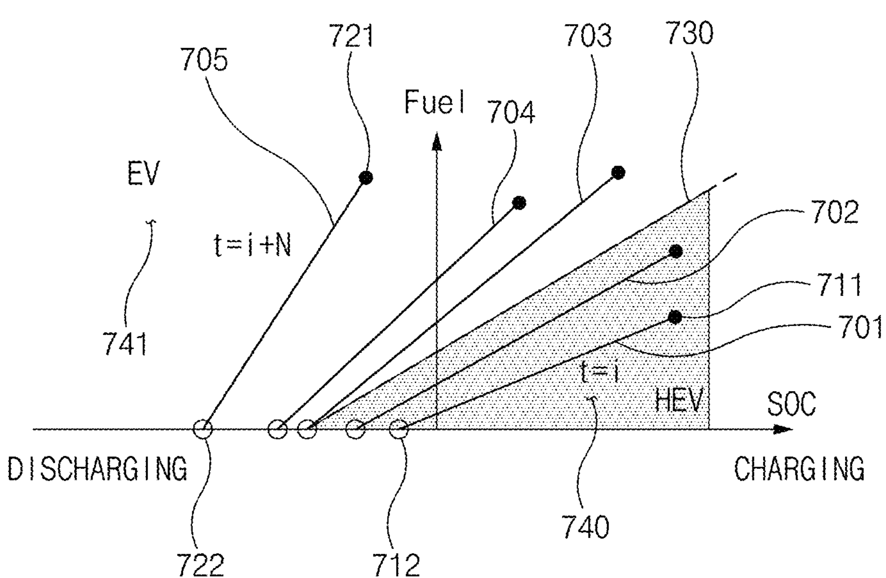
Figure 7B:
Figure 7B:
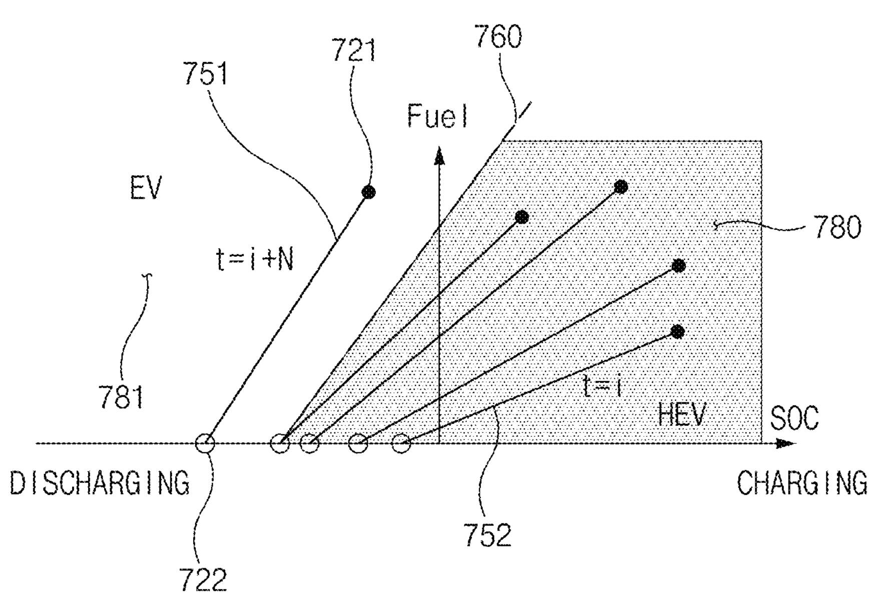

FIGS. 7A and 7B illustrate an example describing fuel consumption information obtained by a vehicle control device according to an embodiment of the present disclosure. A vehicle control device 100 of FIGS. 7A and 7B may be referred to a vehicle control device 100 of FIG. 1. Referring to FIGS. 7A and 7B, an example of different graphs 700 and 750 illustrating a relationship between an SOC and fuel is illustrated. The graphs 700 and 750 may be referred to the fuel consumption information of FIG. 6.

FIG. 7A illustrates an example describing a case in which an HEV ratio included in ratio information (e.g., ratio information 510 of FIG. 5) is relatively low. Referring to FIG. 7A, in an embodiment, the vehicle control device 100 may obtain datasets 701, 702, 703, 704, and 705 indicating relations between a first energy amount 621 of FIG. 6 and a second energy amount 622 of FIG. 6, using ratio information (e.g., ratio information 510 of FIG. 5). The datasets 701, 702, 703, 704, and 705 may refer to the relationships between a first energy amount 621 of FIG. 6 and a second energy amount 622 of FIG. 6 over time. The datasets 701, 702, 703, 704, and 705 may be referred to as energy model values.

In an embodiment, the first dataset 701 may indicate a relationship between a first energy amount 711 and a second energy amount 712, in a first time (e.g., i of FIG. 7A). For example, the first dataset 701 may indicate a straight line (or a graph) including the first energy amount 711 and the second energy amount 712, in the first time. The fifth dataset 705 may indicate a relationship between a first energy amount 721 and a second energy amount 722, in a fifth time (e.g., i+N of FIG. 7A) when a specified time (e.g., N of FIG. 7A) elapses from the first time. The energy amount 711 and the first energy amount 721 may be included in a first energy amount 621 of FIG. 6. The second energy amount 712 and the second energy amount 722 may be included in a second energy amount 622 of FIG. 6.

In an embodiment, the vehicle control device 100 may identify a reference slope 730, using the ratio information. For example, the vehicle control device 100 may compare a slope of each of the datasets 701, 702, 703, 704, and 705 with the reference slope 730 to select a vehicle control mode. When the predicted load is small, the accelerator position sensor (APS) load is small, or the efficiency of a system associated with an EV mode (or an HEV mode) on the APS decreases, the slope of each of the datasets 701, 702, 703, 704, and 705 may be a relatively high slope.

The vehicle control device 100 according to an embodiment may control a vehicle, based on a first mode (e.g., the HEV mode) at a time point corresponding to each of the datasets 701 and 702 included in an area 740 lower than the reference slope 730. The vehicle control device 100 according to an embodiment may control the vehicle, based on a second mode (e.g. the EV mode) at a time point corresponding to each of the datasets 703, 704, and 705 included in an area 741 higher than the reference slope 730.

FIG. 7B illustrates an example describing a case in which an HEV ratio included in ratio information (e.g., ratio information 510 of FIG. 5) is relatively high. Referring to FIG. 7B, the vehicle control device 100 according to an embodiment may control the vehicle, based on the first mode (e.g., the HEV mode) at a time point corresponding to datasets (e.g., a dataset 752) included in an area 780 lower than a reference slope 760. The vehicle control device 100 may control the vehicle, based on the second mode (e.g. the EV mode) at a time point corresponding to a dataset 751 included in an area 781 higher than the reference slope 760.

As described above, although obtaining a dataset indicating a relationship between the first energy amount and/or the second energy amount, which are the same as each other, in a second layer (e.g., a second layer 505 of FIG. 5), the vehicle control device 100 according to an embodiment may control the vehicle. The vehicle control device 100 may control the vehicle based on different control modes depending on different pieces of ratio information (e.g., ratio information corresponding to the reference slope 730 and ratio information corresponding to the reference slope 760) obtained in a first layer (e.g., a first layer 500 of FIG. 5). The vehicle control device 100 may determine SCO control directionality in a current section (e.g., a partial route in which the vehicle is located), using ratio information for each partial route (e.g., each section).

Figure 8:
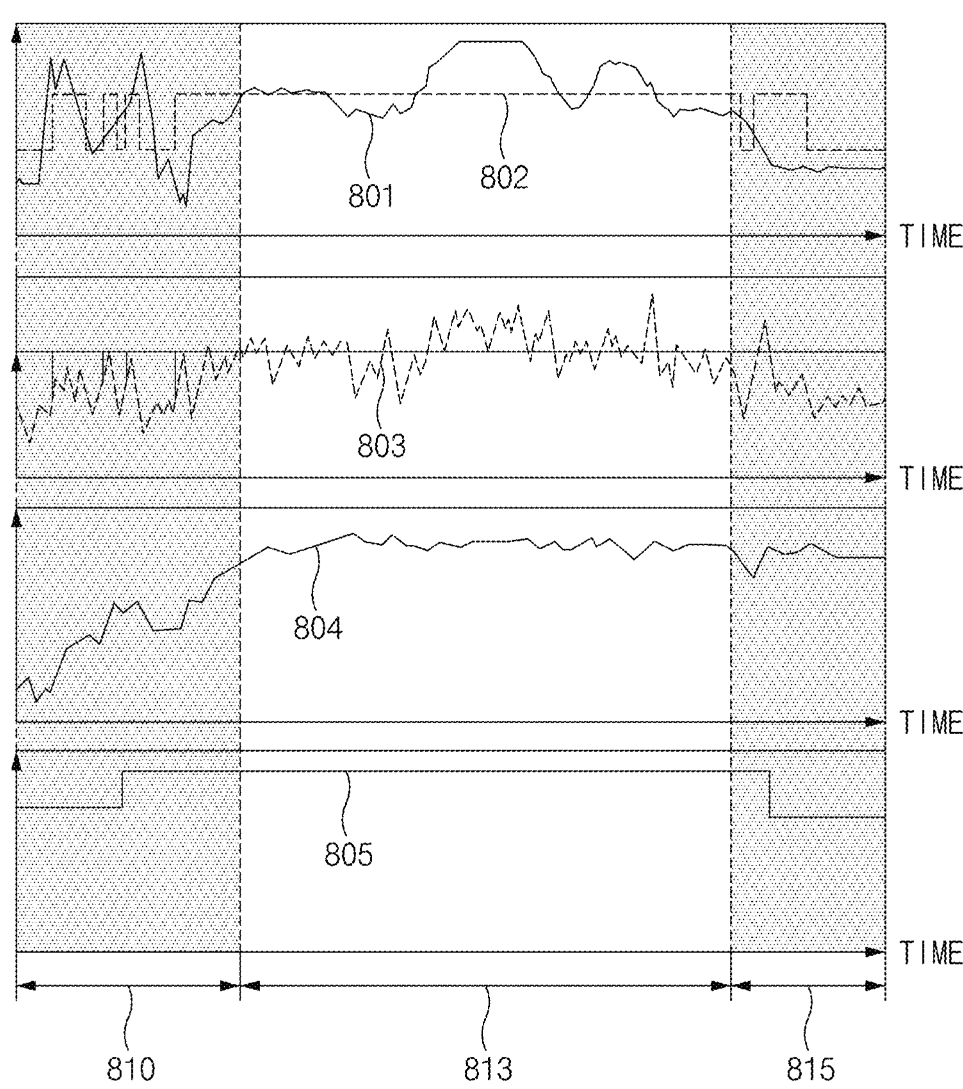
FIG. 8 is a graph illustrating information for selecting a control mode by a vehicle control device according to an embodiment of the present disclosure.

FIG. 8 illustrates an example 800 of a graph illustrating information for selecting a control mode by a vehicle control device according to an embodiment of the present disclosure.

In an embodiment, a graph 801 may indicate grade information corresponding to a route along which a vehicle is traveling. For example, a graph 802 may illustrate a control mode. As an example, referring to the graph 802, the vehicle control device 100 may control a vehicle based on a first mode (e.g., an HEV mode), when the value of the graph 802 is relatively high, and may control the vehicle based on a second mode (e.g., an EV mode), when the value of the graph 802 is relatively low. For example, a graph 803 may illustrate power information 601 of FIG. 6. A graph 804 may illustrate speed information 602 of FIG. 6. A graph 805 may illustrate ratio information 624 of FIG. 6.

The vehicle control device 100 according to an embodiment may identify power information, speed information, and/or ratio information, using map information including grade information.

In an embodiment, referring to the graph 801 illustrating the grade information, it may be seen that the value of the graph 801 is a relatively higher value in a second section 813 of a route than a first section 810 and a third section 815 of the route. The vehicle control device 100 may identify that power to climb a hill is required, in the second section 813 subsequent to a current location (e.g., the first section 810).

For example, referring to the graph 802, the vehicle control device 100 may control the vehicle to turn on the driving of an engine to charge a battery, in the first section 810.

For example, referring to the graph 804 and the graph 805, the vehicle control device 100 may identify that the HEV ratio has a relatively high value, in the first section 810, to climb the hill in the second section 813, thus controlling the vehicle, based on the first mode (e.g., the HEV mode). After the vehicle passes through the second section 813, referring to the graph 802, the vehicle control device 100 may control the vehicle to turn off the operation of the engine (i.e., driving of the engine) to reduce fuel consumption, in the third section 815. Referring to the graph 805, the vehicle control device 100 may identify that the HEV ratio has the relatively low value, thus controlling the vehicle based on the second mode (e.g., the EV mode).

As described above, the vehicle control device 100 according to an embodiment may select the control mode of the vehicle using the map information, the power information, the speed information, and/or the ratio information.

Figure 9:
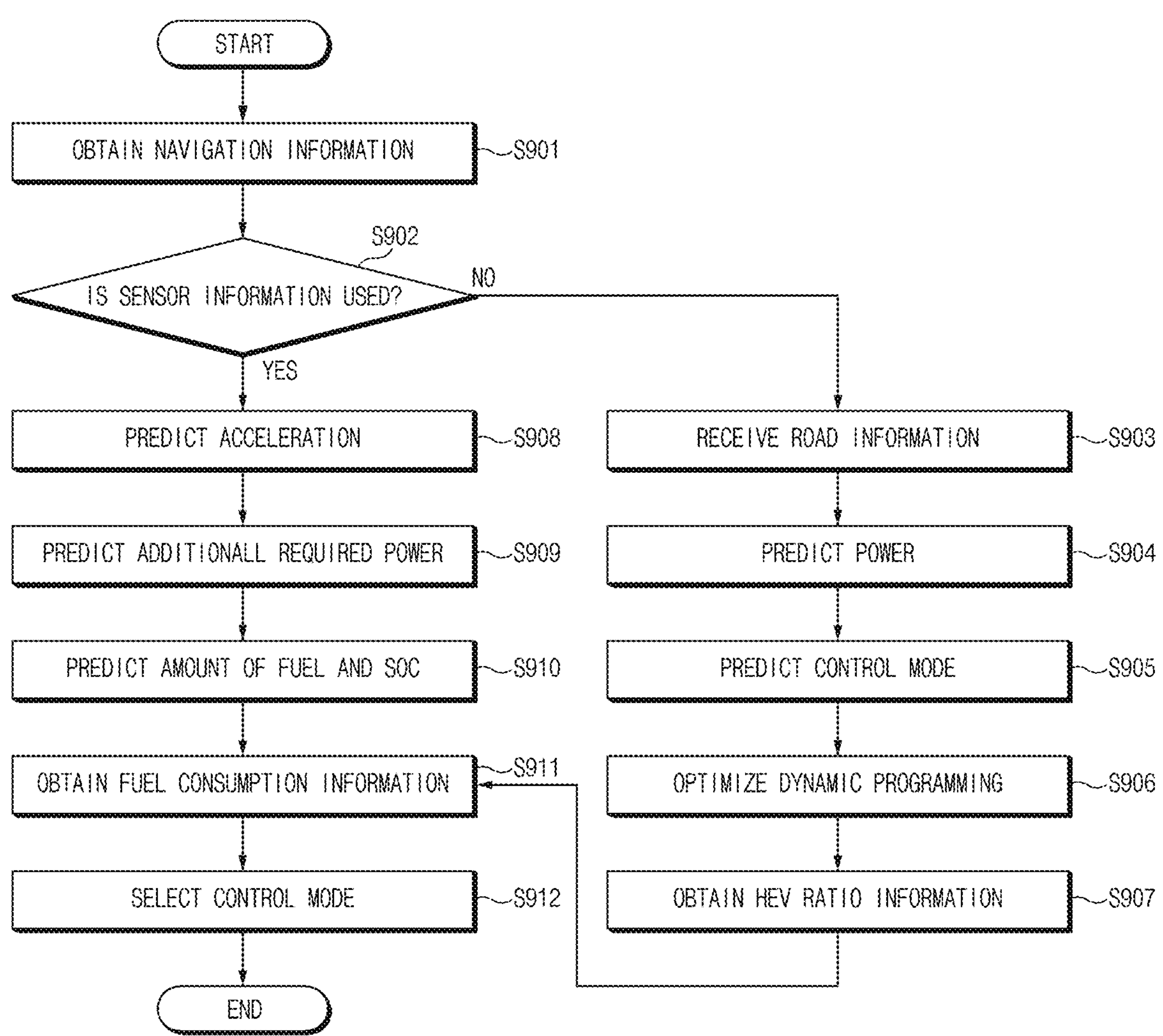
FIG. 9 is a flowchart describing an operation of a vehicle control device according to an embodiment of the present disclosure.

FIG. 9 illustrates an example of a flowchart indicating an operation of a vehicle control device according to an embodiment of the present disclosure. Hereinafter, it is assumed that a vehicle control device 100 of FIG. 1 performs a process of FIG. 9. Furthermore, in a description of FIG. 9, an operation described as being performed by a device may be understood as being controlled by a processor 110 of the vehicle control device 100. At least one of operations of FIG. 9 may be performed by the vehicle control device 100 of FIG. 1. The respective operations of FIG. 9 may be sequentially performed, but are not necessarily sequentially performed. For example, an order of the respective operations may be changed, and at least two operations may be performed in parallel.

Referring to FIG. 9, in S901, the vehicle control method according to an embodiment may include obtaining navigation information. The navigation information may include map information 501 of FIG. 5.

Referring to FIG. 9, in S902, the vehicle control method according to an embodiment may include checking whether to use sensor information. The using of the sensor information may include being performed by a second layer 505 of FIG. 5. The not using of the sensor information may include being performed by a first layer 500 of FIG. 5.

Referring to FIG. 9, when the sensor information is not used (S902—NO), in S903, the vehicle control method according to an embodiment may include receiving road information. The road information may include a route along which a vehicle may travel and grade information of a road corresponding to the route.

Referring to FIG. 9, in S904, the vehicle control method according to an embodiment may include predicting power for driving the vehicle.

Referring to FIG. 9, in S905, the vehicle control method according to an embodiment may include predicting a mode for controlling the vehicle. The mode for controlling the vehicle may include an EV mode and/or an HEV mode.

Referring to FIG. 9, in S906, the vehicle control method according to an embodiment may include optimizing dynamic programming. The optimization of the dynamic programming may include selecting, by a vehicle control device, a control mode (e.g., a first control mode 310) of at least one of a plurality of partial routes.

Referring to FIG. 9, in S907, the vehicle control method according to an embodiment may include obtaining HEV ratio information. The HEV ratio information may be referred to ratio information 510 of FIG. 5.

Referring to FIG. 9, when the sensor information is used (S902—YES), in S908, the vehicle control method according to an embodiment may include predicting acceleration. The vehicle control method may include identifying acceleration to change while the vehicle is traveling along the route, using the sensor information. For example, the vehicle control method may perform operation S908 and operation S903 in parallel.

Referring to FIG. 9, in S909, the vehicle control method according to an embodiment may include predicting additional required power. The additional required power may indicate the power required to obtain acceleration. The power may be output from an engine and/or a motor.

Referring to FIG. 9, in S910, the vehicle control method according to an embodiment may include predicting an amount of fuel and an SOC. Information indicating the predicted amount of fuel and the predicted SOC may be referred to a first energy amount 621 of FIG. 6 and/or a second energy amount 622 of FIG. 6.

Referring to FIG. 9, in S911, the vehicle control method according to an embodiment may include obtaining fuel consumption information. The vehicle control method may include obtaining the fuel consumption information, using the predicted amount of fuel and the predicted SOC and the HEV ratio information obtained in S907. The fuel consumption information may be represented as a graph 700 of FIG. 7A or a graph 750 of FIG. 7B.

Referring to FIG. 9, in S912, the vehicle control method according to an embodiment may include selecting a control mode for controlling the vehicle using the fuel consumption information. The vehicle control method may include controlling the vehicle along the route, based on an EV mode or an HEV mode, by the fuel consumption information.

Figure 10:
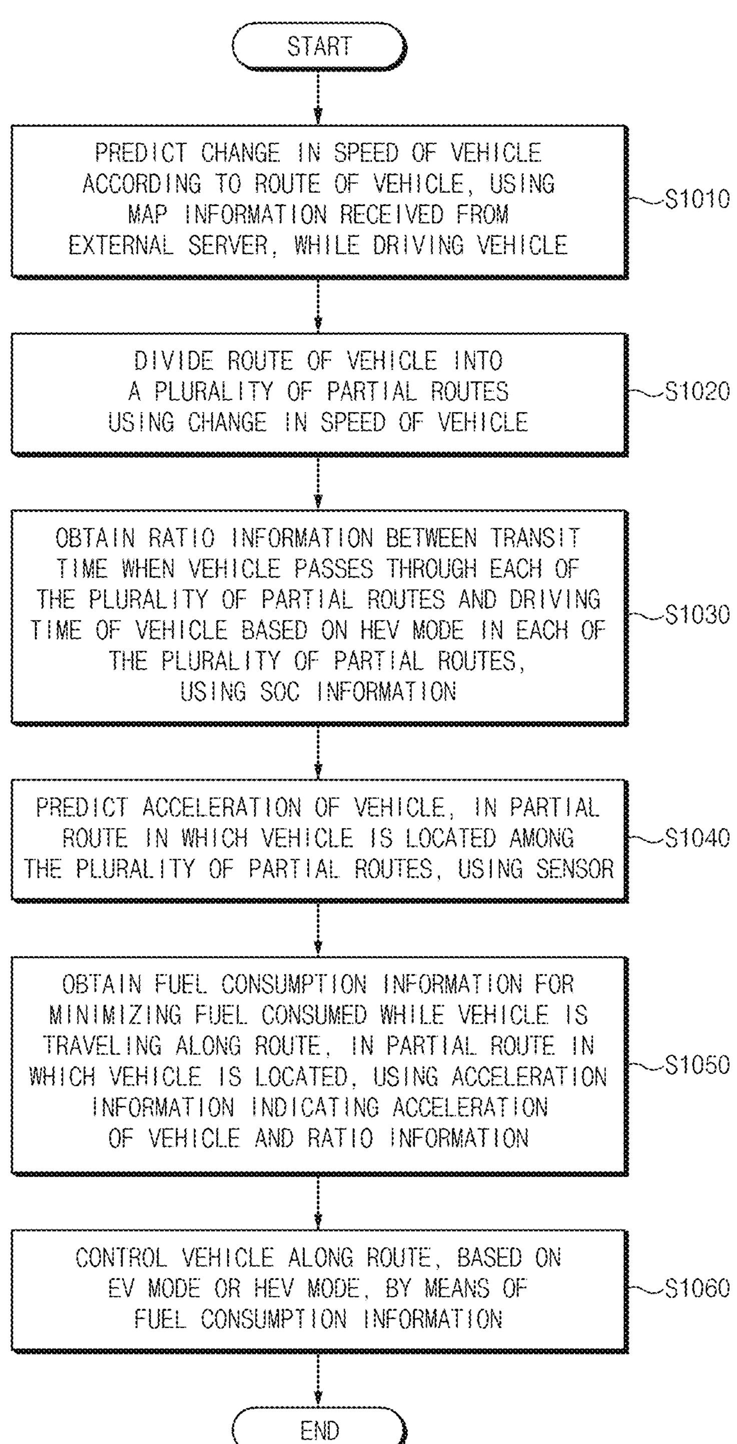
FIG. 10 is a flowchart illustrating a vehicle control method according to an embodiment of the present disclosure.

FIG. 10 illustrates an example of a flowchart illustrating a vehicle control method according to an embodiment of the present disclosure. Hereinafter, it is assumed that a vehicle control device 100 of FIG. 1 performs a process of FIG. 10. Furthermore, in a description of FIG. 10, an operation described as being performed by a device may be understood as being controlled by a processor 110 of the vehicle control device 100. At least one of the operations of FIG. 10 may be performed by the vehicle control device 100 of FIG. 1. The respective operations of FIG. 10 may be sequentially performed, but are not necessarily sequentially performed. For example, an order of the respective operations may be changed, and at least two operations may be performed in parallel. At least one of the operations of FIG. 10 may be associated with at least one of the operations of FIG. 9.

Referring to FIG. 10, in S1010, the vehicle control method according to an embodiment may include predicting a change in the speed of a vehicle based on a route of the vehicle, using map information received from an external server, while driving the vehicle. The vehicle control method may include controlling the vehicle on which a vehicle control device is mounted to move based on autonomous driving (or activating a driver assistance function).

Referring to FIG. 10, in S1020, the vehicle control method according to an embodiment may include dividing the route of the vehicle into a plurality of partial routes using the change in speed of the vehicle. The plurality of partial routes may be referred to a plurality of partial routes 350 of FIG. 5.

Referring to FIG. 10, in S1030, the vehicle control method according to an embodiment may include obtaining ratio information (e.g., an HEV ratio of FIG. 5) between a transit time when the vehicle passes through each partial route of the plurality of partial routes and a driving time of the vehicle based on an HEV mode in each partial route of the plurality of partial routes, using SOC information. The vehicle control method according to an embodiment may include obtaining (or inferring) SOC information of a battery, which may be change based on the change in speed of the vehicle, in each partial route of the plurality of partial routes, before performing S1030.

Referring to FIG. 10, in S1040, the vehicle control method according to an embodiment may include predicting the acceleration of the vehicle, in a partial route in which the vehicle is located among the plurality of partial routes, using a sensor. The process of predicting the vehicle using the sensor may include being associated with local path planning. The partial route in which the vehicle is located may be referred to a first partial route 350-1 of FIG. 3.

Referring to FIG. 10, in S1050, the vehicle control method according to an embodiment may include obtaining fuel consumption information for minimizing fuel consumed while the vehicle is traveling along the route, in the partial route in which the vehicle is located, using acceleration information indicating the acceleration of the vehicle and the ratio information. The vehicle control method may include obtaining the fuel consumption information by a first vehicle control module 611 of FIG. 6 and/or a second vehicle control model 612 of FIG. 6.

Referring to FIG. 10, in S1060, the vehicle control method according to an embodiment may include controlling the vehicle along the route, based on the EV mode or the HEV mode, by the fuel consumption information. The vehicle control device may adjust a time to control the vehicle based on the HEV mode and the EV mode, while controlling the vehicle, thus improving fuel efficiency.

Figure 11:
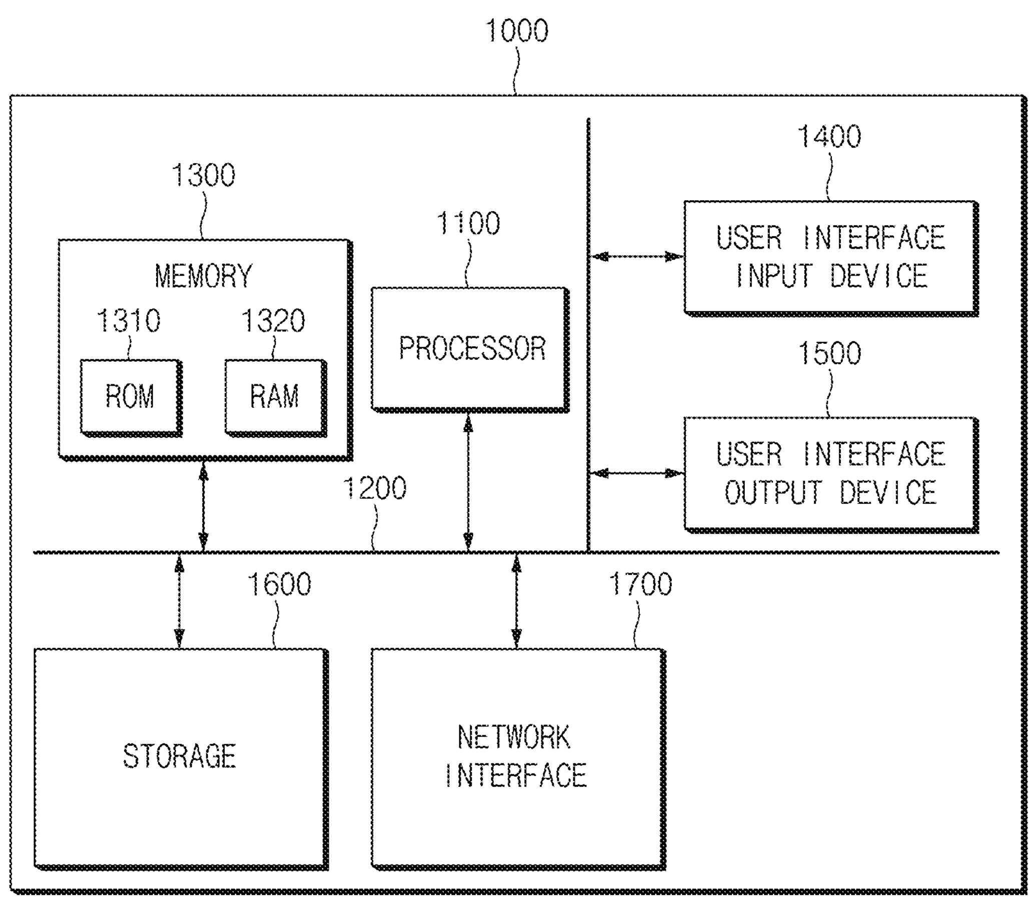
FIG. 11 illustrates a computing system associated with a vehicle control device or a vehicle control method according to an embodiment of the present disclosure.

FIG. 11 illustrates a computing system associated with a vehicle control device or a vehicle control method according to an embodiment of the present disclosure.

Referring to FIG. 11, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory and/or the storage) such as a RAM, a flash memory, a ROM, an EPROM, an EEPROM, a register, a hard disc, a removable disk, and a CD-ROM.

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may control a hybrid electric vehicle (HEV), based on an HEV mode or an electric vehicle (EV) mode.

The present technology may divide a route from a location of the vehicle to a destination into a plurality of partial routes and may control the vehicle, using ratio information corresponding to each partial route of the plurality of partial routes.

The present technology may predict power and speed, using sensor information obtained in real-time, thus minimizing fuel consumed while driving the vehicle.

In addition, various effects ascertained directly or indirectly through the present disclosure may be provided.

Hereinabove, although the present disclosure has been described with reference to the embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, the embodiments of the present disclosure are not intended to limit the technical spirit of the present disclosure, but are provided only for the illustrative purpose. The scope of the present disclosure should be construed based on the accompanying claims, and all the technical ideas within the scope equivalent to the claims should be included in the scope of the present disclosure.

What is claimed is:

1. A vehicle control device, comprising:

a processor;

a sensor;

a battery; and a memory, wherein the processor is configured to:

predict a change in speed of a vehicle based on a route of the vehicle, and map information received from an external server, while driving the vehicle;

divide the route of the vehicle into a plurality of partial routes, using the change in speed of the vehicle;

obtain state of charge (SOC) information of the battery in each partial route of the plurality of partial routes, wherein the SOC information changes based on the change in speed of the vehicle;

obtain ratio information between a transit time when the vehicle passes through each partial route and a driving time of the vehicle based on a hybrid electric vehicle (HEV) mode in each partial route, using the SOC information, wherein the processor is configured to obtain the ratio information from the map information, in a first layer including a dynamic programming algorithm and associated with global path planning;

predict acceleration of the vehicle, in a partial route in which the vehicle is located among the plurality of partial routes, using the sensor;

obtain fuel consumption information for minimizing fuel consumed while the vehicle is traveling along the route, in the partial route in which the vehicle is located, using acceleration information indicating the predicted acceleration of the vehicle and the ratio information, wherein the processor is configured to obtain the fuel consumption information, using the ratio information obtained in the first layer, in a second layer including at least one of an acceleration prediction model, a vehicle required power model, or a vehicle control model, and associated with local path planning; and control an operation of at least one of a motor or an engine of the vehicle along the route, based on a mode for minimizing an amount of increase in fuel compared to an amount of increase in SOC between an electric vehicle (EV) mode or the HEV mode, using the fuel consumption information.

2. The vehicle control device of claim 1, wherein the processor is configured to:

predict the acceleration of the vehicle, based on at least one of a relative location of another vehicle located around the vehicle and a speed of the other vehicle, using the sensor.

3. The vehicle control device of claim 1, wherein the processor is configured to:

identify an average speed of the vehicle in each partial route, wherein the average speed follows the change in speed of the vehicle; and obtain the SOC information of the battery in each partial route, the SOC information indicating an SOC of the battery, and the SOC information corresponding to the average speed of the vehicle.

4. The vehicle control device of claim 1, wherein the processor is configured to:

predict power, using at least one of a rolling resistance coefficient (RRC) of a wheel of the vehicle, an aerodynamic coefficient, an equivalent test weight (ETW), or any combination thereof;

predict a speed of the vehicle, the speed to be obtained based on the acceleration; and obtain the fuel consumption information, using at least one of power information indicating the predicted power, speed information indicating the speed of the vehicle, the ratio information, or any combination thereof.

5. The vehicle control device of claim 4, wherein the processor is configured to:

predict a first energy amount to be consumed when controlling the vehicle along at least a portion of the route based on the HEV mode, using the power information and the speed information;

predict a second energy amount to be consumed when controlling the vehicle along at least a portion of the route based on the EV mode; and obtain the fuel consumption information, using the first energy amount and the second energy amount.

6. The vehicle control device of claim 5, wherein the processor is configured to:

calculate another piece of SOC information indicating an SOC of the battery using the power information and the speed information, the other piece of SOC information changes when controlling the vehicle based on the EV mode; and obtain the fuel consumption information, using the calculated other SOC information and the ratio information.

7. The vehicle control device of claim 1, wherein the processor is configured to:

identify the transit time when the vehicle passes through each partial route based on an average speed of the vehicle, wherein the average speed follows the change in speed of the vehicle.

8. The vehicle control device of claim 1, wherein the processor is configured to:

control the vehicle based on the EV mode or the HEV mode, along the partial route in which the vehicle is located, using sub-ratio information corresponding to the partial route in which the vehicle is located in the ratio information and the acceleration information.

9. The vehicle control device of claim 1, wherein the processor is configured to:

obtain the ratio information, using engine information indicating whether to drive the engine for controlling the vehicle based on the HEV mode.

10. The vehicle control device of claim 1, wherein the map information includes at least one of grade information of a road corresponding to the route, a speed limit of the road, traffic volume on the road, or any combination thereof.

11. A vehicle control method, comprising:

predicting a change in speed of a vehicle based on a route of the vehicle, using map information received from an external server, while driving the vehicle;

dividing the route of the vehicle into a plurality of partial routes, using the change in speed of the vehicle;

obtaining state of charge (SOC) information of a battery in each partial route of the plurality of partial routes, wherein the SOC information changes based on the change in speed of the vehicle;

obtaining ratio information between a transit time when the vehicle passes through each partial route and a driving time of the vehicle based on a hybrid electric vehicle (HEV) mode in each partial route, using the SOC information, wherein obtaining the ratio information includes obtaining the ratio information from the map information, in a first layer including a dynamic programming algorithm and associated with global path planning, and predicting acceleration of the vehicle, in a partial route in which the vehicle is located among the plurality of partial routes, using a sensor;

obtaining fuel consumption information for minimizing fuel consumed while the vehicle is traveling along the route, in the partial route in which the vehicle is located, using acceleration information indicating the predicted acceleration of the vehicle and the ratio information, wherein obtaining the fuel consumption information includes obtaining the fuel consumption information, using the ratio information obtained in the first layer, in a second layer including at least one of an acceleration prediction model, a vehicle required power model, or a vehicle control model, and associated with local path planning; and controlling an operation of at least one of a motor or an engine of the vehicle along the route, based on an electric vehicle (EV) mode or the HEV, using the fuel consumption information.

12. The vehicle control method of claim 11, wherein the predicting of the acceleration includes:

predicting the acceleration of the vehicle, based on at least one of a relative location of another vehicle located around the vehicle and a speed of the other vehicle, using the sensor.

13. The vehicle control method of claim 11, wherein the obtaining of the SOC information of the battery includes:

identifying an average speed of the vehicle, the average speed following the change in speed of the vehicle, in each partial route; and obtaining the SOC information of the battery, the SOC information indicating an SOC of the battery, and the SOC information corresponding to the average speed of the vehicle in each partial route.

14. The vehicle control method of claim 11, wherein obtaining the fuel consumption information includes:

predicting power, using at least one of a rolling resistance coefficient (RRC) of a wheel of the vehicle, an aerodynamic coefficient, an equivalent test weight (ETW), or any combination thereof;

predicting a speed of the vehicle, the speed to be obtained based on the acceleration; and obtaining the fuel consumption information, using at least one of power information indicating the predicted power, speed information indicating the speed of the vehicle, the ratio information, or any combination thereof.

15. The vehicle control method of claim 14, wherein obtaining the fuel consumption information includes:

predicting a first energy amount to be consumed when controlling the vehicle along at least a portion of the route based on the HEV mode, using the power information and the speed information;

predicting a second energy amount to be consumed when controlling the vehicle along at least a portion of the route based on the EV mode; and obtaining the fuel consumption information, using the first energy amount and the second energy amount.

16. The vehicle control method of claim 15, wherein the obtaining of the fuel consumption information includes:

calculating another piece of SOC information indicating an SOC of the battery using the power information and the speed information, the other piece of SOC information changes when controlling the vehicle based on the EV mode; and obtaining the fuel consumption information, using the calculated other SOC information and the ratio information.

17. The vehicle control method of claim 11, further comprising:

identifying the transit time when the vehicle passes through each partial route based on an average speed of the vehicle, the average speed following the change in speed of the vehicle.

18. The vehicle control method of claim 11, wherein the controlling of the vehicle includes:

controlling the vehicle based on the EV mode or the HEV mode, along the partial route in which the vehicle is located, using sub-ratio information corresponding to the partial route in which the vehicle is located in the ratio information and the acceleration information.

19. The vehicle control method of claim 11, wherein obtaining the ratio information includes:

obtaining the ratio information, using engine information indicating whether to drive the engine for controlling the vehicle based on the HEV mode.

20. The vehicle control method of claim 11, wherein the map information includes at least one of grade information of a road corresponding to the route, a speed limit of the road, traffic volume on the road, or any combination thereof.

* * * * *